(12) United States Patent
Lee et al.

(10) Patent No.: US 11,228,968 B2
(45) Date of Patent: *Jan. 18, 2022

(54) ELECTRONIC APPARATUS AND METHOD OF SETTING NETWORK OF AUDIO DEVICE

(71) Applicant: SAMSUNG ELECTRONICS CO., LTD., Suwon-si (KR)

(72) Inventors: Yong-woo Lee, Hwaseong-si (KR); Chang-heon Yoon, Hwaseong-si (KR); Jong-min Kim, Suwon-si (KR); Sang-hun Park, Hwaseong-si (KR); Sung-min So, Suwon-si (KR); Wha-seob Sim, Suwon-si (KR); Se-young Oh, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/657,334

(22) Filed: Oct. 18, 2019

(65) Prior Publication Data
US 2020/0053641 A1 Feb. 13, 2020

Related U.S. Application Data

(63) Continuation of application No. 14/989,193, filed on Jan. 6, 2016, now Pat. No. 10,477,461.
(Continued)

(30) Foreign Application Priority Data
Jan. 30, 2015 (KR) .......................... 10-2015-0015333

(51) Int. Cl.
H04W 48/16 (2009.01)
H04W 48/20 (2009.01)

(52) U.S. Cl.
CPC ............ H04W 48/16 (2013.01); H04W 48/20 (2013.01)

(58) Field of Classification Search
CPC combination set(s) only.
See application file for complete search history.

(56) References Cited

U.S. PATENT DOCUMENTS 9,148,843 B2 * 9/2015 Scherzer ............... H04W 48/18
9,763,094 B2 * 9/2017 Thelen .................. H04W 12/08
(Continued)

FOREIGN PATENT DOCUMENTS

CN 103124422 A 5/2013
CN 103781151 A 5/2014
(Continued)

OTHER PUBLICATIONS

Communication dated Jun. 19, 2019, issued by the European Patent Office in counterpart European Application No. 19176590.8.
(Continued)

Primary Examiner — Steven S Kelley
(74) Attorney, Agent, or Firm — Sughrue Mion, PLLC

(57) ABSTRACT

Provided are an electronic apparatus and a method which is performable by the electronic apparatus to set a network of an audio device. Furthermore, provided are an electronic apparatus that may transmit, via a second communication method, access point connection information that corresponds to an access point that is connected via a first communication method to an audio device, and a method for setting a network of the audio device.

16 Claims, 14 Drawing Sheets

Related U.S. Application Data

(60) Provisional application No. 62/100,160, filed on Jan. 6, 2015.

(56) References Cited

U.S. PATENT DOCUMENTS

| | | | |
|---|---|---|---|
| 10,015,304 B2* | 7/2018 | Lee | H04M 1/72533 |
| 10,477,461 B2* | 11/2019 | Lee | H04W 48/16 |
| 2004/0077313 A1 | 4/2004 | Oba et al. | |
| 2006/0229016 A1 | 10/2006 | Jang et al. | |
| 2006/0276133 A1 | 12/2006 | Ly et al. | |
| 2010/0195539 A1 | 8/2010 | Tian et al. | |
| 2011/0037712 A1* | 2/2011 | Kim | H04M 1/72583 345/173 |
| 2012/0084003 A1 | 4/2012 | Park et al. | |
| 2012/0244814 A1 | 9/2012 | Okayasu | |
| 2012/0315839 A1 | 12/2012 | Mumcuoglu et al. | |
| 2013/0173811 A1 | 7/2013 | Ha et al. | |
| 2013/0288602 A1 | 10/2013 | Spencer | |
| 2014/0004793 A1 | 1/2014 | Bandyopadhyay et al. | |
| 2014/0118778 A1* | 5/2014 | Lee | G06K 15/4045 358/1.15 |
| 2014/0119234 A1 | 5/2014 | Kwon | |
| 2014/0256250 A1 | 9/2014 | Cueto et al. | |
| 2014/0269651 A1 | 9/2014 | Luna | |
| 2015/0163712 A1* | 6/2015 | Ljung | H04W 36/00 455/436 |
| 2015/0181515 A1 | 6/2015 | Onohara et al. | |
| 2015/0271741 A1 | 9/2015 | Li et al. | |
| 2015/0327069 A1* | 11/2015 | Fu | H04W 76/10 726/5 |
| 2015/0365787 A1 | 12/2015 | Farrell | |
| 2016/0253145 A1* | 9/2016 | Lee | H04W 4/06 381/79 |

FOREIGN PATENT DOCUMENTS

| | | |
|---|---|---|
| CN | 104254005 A | 12/2014 |
| EP | 2611079 A1 | 7/2013 |
| EP | 2 725 850 A2 | 4/2014 |
| EP | 2 733 974 A1 | 5/2014 |
| KR | 10-0799794 B1 | 1/2008 |
| KR | 10-2008-0023465 A | 3/2008 |
| KR | 10-2013-0080487 A | 7/2013 |
| KR | 10-2014-0081270 A | 7/2014 |
| WO | 03/096741 A2 | 11/2003 |
| WO | 2012/046887 A1 | 4/2012 |

OTHER PUBLICATIONS

International Search Report (PCT/ISA/210) dated May 18, 2016 issued by the International Searching Authority in counterpart International Application No. PCT/KR2016/000965.

Written Opinion (PCT/ISA/237) dated May 18, 2016 issued by the International Searching Authority in counterpart International Application No. PCT/KR2016/000965.

Communication dated Sep. 1, 2017, issued by the European Patent Office in counterpart European application No. 16743718.5.

Communication from the Korean Intellectual Property Office dated Apr. 27, 2016 in a counterpart Korean application No. 10-2015-0015333.

Communication dated Nov. 16, 2015, issued by the Korean Intellectual Property Office in counterpart Korean Application No. 10-2015-0015333.

Communication dated Oct. 8, 2019 issued by the State Intellectual Property Office of P.R. China in counterpart Chinese Application No. 201680007727.X.

* cited by examiner

ELECTRONIC APPARATUS AND METHOD OF SETTING NETWORK OF AUDIO DEVICE

CROSS-REFERENCE TO RELATED APPLICATIONS

This application is a continuation of U.S. application Ser. No. 14/989,193 filed on Jan. 6, 2016, which claims the benefit of U.S. Provisional Application No. 62/100,160, filed on Jan. 6, 2015 in the U.S. Patent and Trademark Office, and Korean Patent Application No. 10-2015-0015333, filed on Jan. 30, 2015 in the Korean Intellectual Property Office, the disclosures of which are incorporated herein by reference in their respective entireties.

BACKGROUND

1. Field

Exemplary embodiments relate to electronic apparatuses and methods for setting networks of audio devices, and more particularly, to an electronic apparatus configured for wirelessly setting a network of an audio device by using an application that is installed in the electronic apparatus and a method which is performable by the electronic apparatus to set the network of the audio device.

2. Description of the Related Art

Audio devices (e.g., speakers, soundbars, and home theaters) that support not only wired connection but also wireless connection have been developed. Wireless audio devices may provide various pieces of audio content to users via coder/decoders (i.e., "codecs") that provide a high-quality sound and the convenience of a wireless method. For wireless connection to an access point (or a router), a wireless network of an audio device must be set. It may be difficult for a user to set a network of an audio device based on whether there are a display and a button (including a number key) for network setup. Further, when there are a plurality of audio devices having wireless networks that must be set, a user must repeatedly perform the same process of setting a wireless network.

SUMMARY

Provided are an electronic apparatus that is configured to easily and simply set a network of an audio device and a method that is performable by the electronic apparatus to set the network of the audio device.

Additional aspects will be set forth in part in the description which follows and, in part, will be apparent from the description, or may be learned by practice of the presented exemplary embodiments.

According to an aspect of an exemplary embodiment, an electronic apparatus includes: a first communication interface which is wirelessly connected to an access point; a second communication interface which is wirelessly connected to an audio device having a changed audio device name; and a controller configured to control the first communication interface and the second communication interface, wherein the controller is further configured to store access point connection information that corresponds to the access point and to transmit, via the second communication interface, the access point connection information to the audio device.

The controller may be further configured to connect to the audio device via the second communication interface by changing an original audio device name.

According to an aspect of an exemplary embodiment, a method which is performable by an electronic apparatus for setting a network of an audio device includes: storing, in an application that is installed in the electronic device, access point connection information that relates to an access point that is connected to the electronic apparatus via a first communication interface; connecting, via a second communication interface, to an audio device; and transmitting, via the second communication interface, the access point connection information to the audio device, wherein the audio device includes an original audio device name and the changed audio device name.

The connecting to the audio device may include connecting to the audio device by changing the original audio device name.

According to an aspect of an exemplary embodiment, an audio device includes: a first communication interface which is wirelessly connected to an access point by using an original audio device name; a second communication interface which is wirelessly connected to an electronic apparatus by using a changed audio device name; and a controller configured to control the first communication interface and the second communication interface, wherein the controller is further configured to receive, from the electronic device, access point connection information that corresponds to the access point, and to connect to the access point by using the received access point connection information.

When power is supplied to the audio device, the controller may be further configured to change the original audio device name of the audio device to the changed audio device name.

According to an aspect of another exemplary embodiment, an electronic apparatus includes: a touchscreen; and a controller configured to control the touchscreen, wherein the controller is further configured to display, on the touchscreen, a first user interface for receiving a first user input that relates to establishing a wireless communication connection to an access point, and to display, on the touchscreen, a second user interface for receiving a second user input that relates to establishing a wireless communication connection to the access point and an audio device in response to the received first user input.

The controller may be further configured to store access point connection information that corresponds to the access point, and to transmit the access point connection information to the audio device in response to the received second user input.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
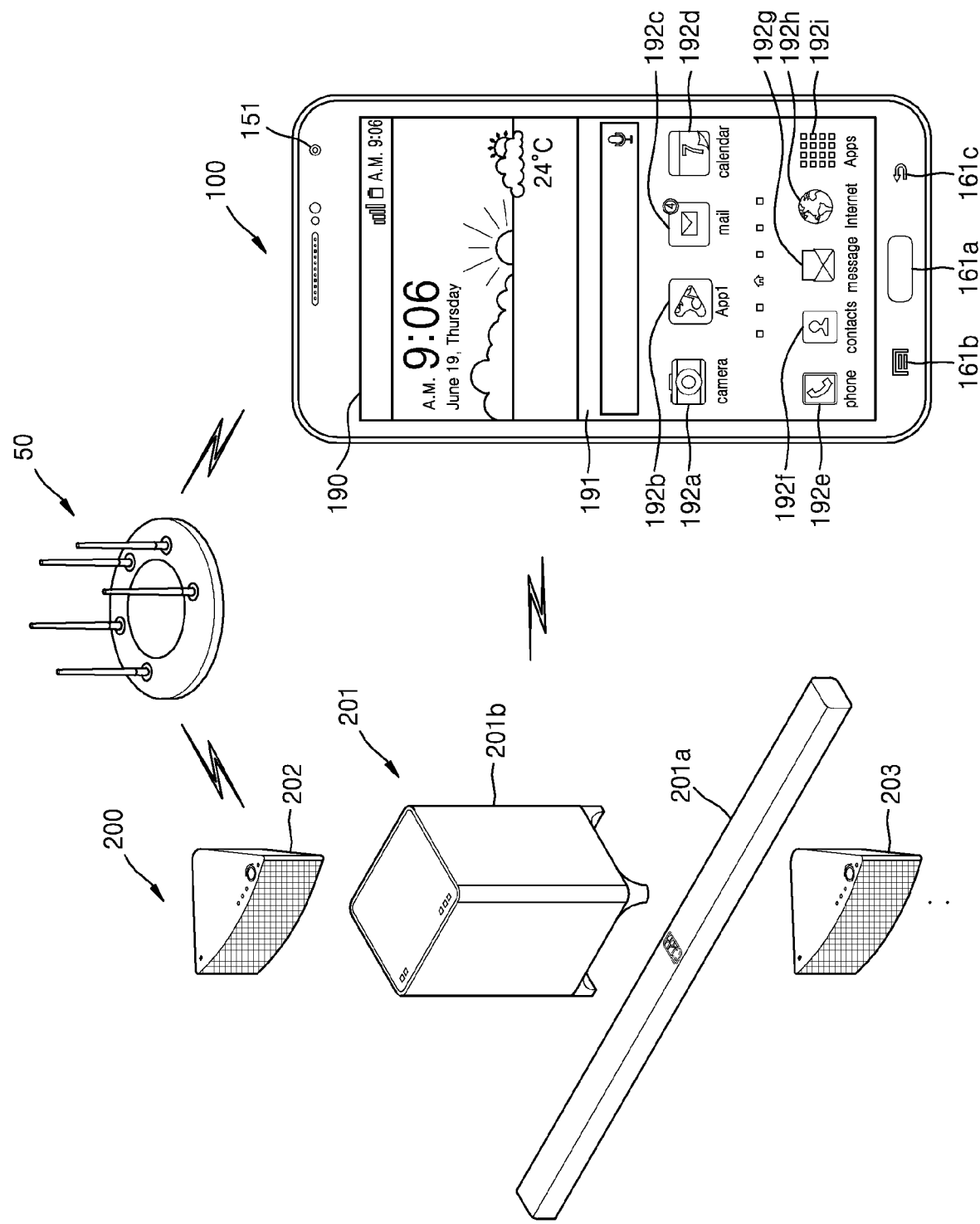
FIG. 1 is a view for explaining an operation between an electronic apparatus and an audio device, according to an exemplary embodiment.

Exemplary embodiments will now be described more fully with reference to the accompanying drawings. In addition, methods for manufacturing and using electronic apparatuses according to exemplary embodiments will now be described more fully with reference to the accompanying drawings. In the drawings, elements having substantially the same functions are denoted by the same reference numerals or symbols.

It will be understood that, although the terms first, second, third etc. may be used herein to describe various elements, these elements should not be limited by these terms. These terms are only used to distinguish one element from another element. Thus, a first element discussed below could be termed a second element and, similarly, a second element could be termed a first element without departing from the teachings of exemplary embodiments. As used herein, the term "and/or" includes any and all combinations of one or more of the associated listed items.

When a "key" (or a button) provided (or formed) on an electronic apparatus or an audio device is selected, it may connote that the key (or the button) may be pressed or touched.

The term "application" refers to software that is executable on an operating system (OS) for a computer or on a mobile OS and is usable by a user. Examples of an application may include any of a contacts application, a calendar application, a memo application, an alarm application, a social network system (SNS) application, a chatting application, a map application, a word processor, a spread sheet, a music player, and a video player.

The term "application" according to an exemplary embodiment may refer to software that is executable on an electronic apparatus or an external device (e.g., a server or an audio device) that is wirelessly or wiredly connected to the electronic apparatus. The term "application" according to an exemplary embodiment may refer to software that may control a function or an operation of an external device (e.g., a server or an audio device) that is wirelessly or wiredly connected to an electronic apparatus in which the application is installed. The term "application" according to an exemplary embodiment may refer to software that is executable on an electronic apparatus in response to a received user input.

Content may be executable on an application of an electronic apparatus. Examples of content may include a video file and/or an audio file that is played in a video player that is an application, a music file that is played in a music player, a photo file that is displayed on a photo gallery, and/or a web page file that is displayed on a web browser. Contents may refer to a plurality of pieces of content.

Examples of content may include any of a video file, an audio file, a text file, an image file, and a web page that are displayable on or executable on an application. The term "video" used herein may be interchangeably used with a moving image. Examples of content may include any of a video file, an audio file, a text file, an image file, and a web page that are executable in response to a received user input (e.g., a touch). Examples of content include an application screen that is executable and a user interface that constitutes the application screen. The term "widget" refers to a mini application that is a type of graphical user interface (GUI) that enables a user to more efficiently interact with an application or an OS. Examples of a widget include a weather widget, a calculator widget, and a clock widget.

A touch (including a touch gesture) may be input by using a user's body part and/or by using an input pen.

In an exemplary embodiment, an original audio device name may be a first audio device name. A changed audio device name may be a second audio device name.

When an audio device is turned on, it may mean that in a state in which a power plug of the audio device is inserted into a power source (e.g., a power outlet), power is supplied to the audio device by using a power button.

As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, components, and/or combinations thereof, but do not preclude the presence or addition of one or more other features, integers, steps, operations, elements, components, and/or combinations thereof.

As used herein, the term "and/or" includes any and all combinations of one or more of the associated listed items. Expressions such as "at least one of" when preceding a list of elements, modify the entire list of elements and do not modify the individual elements of the list.

FIG. 1 is a view for explaining an operation between an electronic apparatus 100 and an audio device 200, according to an exemplary embodiment.

Referring to FIG. 1, an access point 50, the electronic apparatus 100, and the audio device 200 may be wirelessly connected to one another by using communication interfaces thereof (not shown). For example, the electronic apparatus 100 and the audio device 200 may be connected in an ad hoc mode, or an infrastructure mode in which the electronic apparatus 100 and the audio device 200 are wirelessly connected to each other via the access point 50. The audio device 200 may be wiredly connected to the electronic apparatus 100. Examples of wireless communication may include, but are not limited to, wireless fidelity (Wi-Fi), Bluetooth, Bluetooth low energy, ZigBee, Wi-Fi Direct, ultra-wideband (UWB), infrared data association (IrDA), and near field communication (NFC).

The electronic apparatus 100 may control a function and/or an operation (e.g., power on/off, volume control, sound effect (e.g., movie, concert, or sports), and/or network setup) of the audio device 200 by using a wireless local area network (LAN) or short-range communication (e.g., Bluetooth or NFC).

The electronic apparatus 100 may output audio (e.g., a music file) to the audio device 200 by using a wireless LAN or short-range communication (e.g., Bluetooth or NFC). Alternatively, the electronic apparatus 100 may output audio (e.g., a music file) to the audio device 200 by using the access point 50 that connects to the electronic apparatus 100 via a wireless LAN. The audio device 200 may receive the audio from the access point 50 and may output the received audio.

The audio device 200 may include a soundbar system 201 which includes a soundbar 201a and a woofer 201b, and audio devices, such as one or more portable speakers 202 and 203. The soundbar system 201 and the audio devices 202 and 203 may be located in a space (e.g., a living room of a house or one office) within which the audio device 200 may access one access point 50. The soundbar system 201 and the audio devices 202 and 203 may be located in different spaces (e.g., a living room of a house, a first room, and a second room, or an office, a first conference room, and a second conference room) from which the audio device 200 may access one access point 50. Alternatively, the soundbar system 201 and the audio devices 202 and 203 may be located in different spaces (e.g., a living room of a house, a first room on a first floor, and a second room on a second floor, or an office on a fifth floor, a first conference room on the fifth floor, and a second conference room on a sixth floor) from which the audio device 200 may access one access point 50.

It will be understood by one of ordinary skill in the art that the audio device 200 may include, but is not limited to, any of a 2-channel system, a 2.1-channel system, a 4-channel system, a 4.1-channel system, a 5.1-channel system, a 6.1-channel system, a 7.1-channel system, a 9.1-channel system, or a 11.2-channel system.

The audio device 200 may output audio that is wirelessly received from the access point 50 that is connected to an external audio source (e.g., the electronic apparatus 100, a server (not shown), and/or a storage (not shown)). Alternatively, the audio device 200 may output audio that is wiredly or wirelessly received from an external audio source (e.g., the electronic apparatus 100, a server (not shown), or a storage (not shown)).

The term "user" according to an exemplary embodiment may refer to a person who controls a function or an operation of the electronic apparatus 100 and/or a function or an operation of the audio device 200. Examples of a user may include a manager and an installer.

In order to control the audio device 200, a remote controller (not shown) that may be manipulated by a user's input may be used. The remote controller may control a function of the audio device 200 by using at least one of a key (including a button), a touchpad, a microphone (not shown) that may receive the user's voice, and a sensor (not shown) that may recognize a motion of the remote controller.

Figure 2:
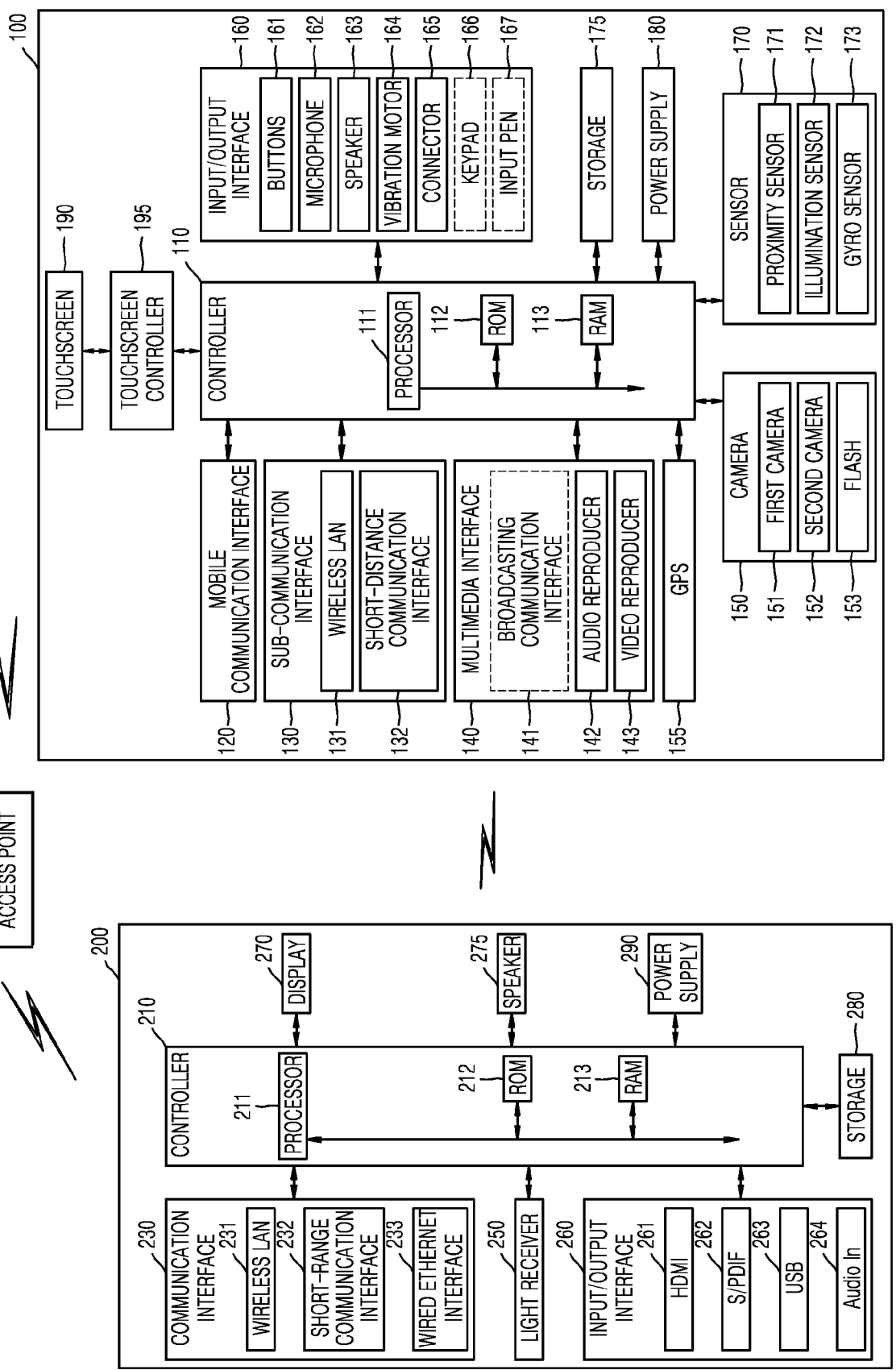
FIG. 2 is a block diagram of the electronic apparatus and the audio device, according to an exemplary embodiment.

FIG. 2 is a block diagram of the electronic apparatus 100 and the audio device 200, according to an exemplary embodiment.

Referring to FIG. 2, the electronic apparatus 100 may be wiredly or wirelessly connected to the audio device 200 by using a mobile communication interface 120, a sub-communication interface 130, and a connector 165. Examples of the electronic apparatus 100 may include any of a mobile phone (not shown), a smartphone (not shown), an MP3 player (not shown), a video player (not shown), a tablet PC (not shown), a wearable apparatus (not shown) that may be worn on a body, an electronic board (not shown), a home appliance (e.g., a refrigerator, an air conditioner, or a cleaner), and a display apparatus (not shown).

It will be understood by one of ordinary skill in the art that examples of the display apparatus may include, but are not limited to, any of an analog television (TV), a digital TV, a three-dimensional (3D)-TV, a smart TV, a light-emitting diode (LED) TV, an organic light-emitting diode (OLED) TV, a plasma TV, a monitor, a curved TV with a screen having a fixed curvature, a flexible TV with a screen having a fixed curvature, a bended TV with a screen having a fixed curvature, and a variable TV with a screen whose curvature may vary based on a received user input.

The electronic apparatus 100 may include an input pen and a touchscreen 190 and may transmit or receive data (or content) to or from the audio device 200 via the mobile communication interface 120 or the sub-communication interface 130. The electronic apparatus 100 may transmit or receive data (or content) to or from an external device via an interaction (e.g., a touch or a touch gesture) that is input via the touchscreen 190. Alternatively, the electronic apparatus 100 may include a display (not shown, including only a display panel without a touch panel) and may transmit or receive data (content) to or from the audio device 200 via the mobile communication interface 120 or the sub-communication interface 130. The electronic apparatus 100 may include one or more touchscreens 190. In addition, the electronic apparatus 100 may include a plurality of screens that are separated to respectively correspond to the touchscreens 190.

The electronic apparatus 100 includes a controller 110, the mobile communication interface 120, the sub-communication interface 130, a multimedia interface 140, a camera 150, a global positioning system (GPS) unit 155, an input/output interface 160, a sensor 170, a storage 175, and a power supply 180. The electronic apparatus 100 further includes the touchscreen 190 and a touchscreen controller 195.

The controller 110 may include a processor 111, a read-only memory (ROM) 112 in which a control program for controlling the electronic apparatus 100 is stored, and a random-access memory (RAM) in which a signal or data that is received from the outside of the electronic apparatus 100 is stored or data for various operations performed by the electronic apparatus 100 is stored. The processor 111, the ROM 112, and the RAM 113 may be provided as semiconductor chips.

The controller 110 controls an overall operation of the electronic apparatus 100 and the flow of signals between the elements 120 through 195 included in the electronic apparatus 100. The controller 110 controls the power supply 180 to supply power to the elements 120. Further, when the user's input or set conditions are satisfied, the controller 110 may execute an individual sensor of the sensor 170, or an OS or an application that is stored in the storage 175.

The processor 111 may include a graphics processing unit (GPU) for graphic processing. The processor 111 may be provided as a system-on-chip (SoC) including a core (not shown) and a GPU (not shown). The processor 111 may include a single core, a dual core, a triple core, a quad core, or a multiple core thereof. Further, the processor 111, the ROM 112, and the RAM 113 may be connected to one another via a bus.

The controller 110 may control the mobile communication interface 120, the sub-communication interface 130, the multimedia interface 140, the camera 150, the GPS unit 155, the input/output interface 160, the sensor 170, the storage 175, the power supply 180, the touchscreen 190, and the touchscreen controller 195.

The controller 110, according to an exemplary embodiment, controls a first communication interface that is wirelessly connected to the access point 50 and a second communication interface that is wirelessly connected to the audio device 200 which has a changed audio device name, stores access point connection information that corresponds to the access point 50 that is connected via the first communication interface, and transmits the access point connection information to the audio device 200 via the second communication interface.

The controller 110 may control the audio device 200 having the changed audio device name that is obtained by changing an original audio device name to be connected via the second communication interface.

The controller 110 may control the audio device 200 that is first supplied with power and has the changed audio device name that is obtained by changing the original audio device name to be connected via the second communication interface.

The controller 110 may control the audio device 200 having the changed audio device name that is discovered via the second communication interface to be preferentially displayed on a screen of the electronic apparatus 100.

When a reply that corresponds to a connection between the audio device 200 and the access point 50 which is established by using the access point connection information is received from the audio device 200, the controller 110 may control the connection to the audio device 200 to be terminated in response to the reply.

The controller 110 may control user feedback to be provided in response to the reply. The user feedback may include at least one of visual feedback, auditory feedback, and tactile feedback.

The controller 110 may control a music application to be displayed in response to the reply and audio data that corresponds to a song selected by using the music application to be output to the audio device 200.

When a plurality of the audio devices 200 for which respective network settings are needed are connected, the controller 110 may control the access point connection information to be transmitted to each of the plurality of audio devices 200.

The controller 110 may control a first user interface which is configured for receiving a first user input that relates to establishing a wireless connection to the access point 50 to be displayed on the touchscreen 190, and may control a second user interface which is configured for receiving a second user input that relates to establishing a wireless connection to the audio device 200 and the access point 50 in response to the received first user input to be displayed on the touchscreen 190.

The controller 110 may control access point connection information that corresponds to the access point 50 that is wirelessly connected to be stored in response to receiving the first user input and to be transmitted to the audio device 200 in response to receiving the second user input.

The controller 110, according to an exemplary embodiment, includes the processor 111, the ROM 112, and the RAM 113.

The mobile communication interface 120 may be connected to the outside via a mobile communication network by using one or more antennas under the control of the controller 110. The mobile communication interface 120 may transmit/receive a wireless signal for any of a voice call, a video call, a short message service (SMS), a multimedia message service (MMS), or data communication to/from any of a mobile phone (not shown) having an available phone number, a smartphone (not shown), a tablet PC, or another electronic apparatus (not shown).

The sub-communication interface 130 may be wirelessly connected to the access point 50 under the control of the controller 110. The sub-communication interface 130 may transmit access point connection information to the audio device 200 under the control of the controller 110.

The sub-communication interface 130 may include at least one of a wireless LAN 131 and a short-range communication interface 132. For example, the sub-communication interface 130 may include one of the wireless LAN 131 and the short-range communication interface 132 or both the wireless LAN 131 and the short-range communication interface 132.

The wireless LAN 131 may be wirelessly connected to the access point 50 in a place at which the access point 50 is provided under the control of the controller 110. The wireless LAN 131 supports the IEEE 802.11x wireless LAN standard of the Institute of Electrical and Electronics Engineers (IEEE). The short-range communication interface 132 may wirelessly perform short-range communication between the electronic apparatus 100 and the audio device 200 without the access point 50 under the control of the control 110. Examples of short-range communication may include Bluetooth, Bluetooth low energy, IrDA, UWB, and NFC.

The electronic apparatus 100 may include at least one of the mobile communication interface 120, the wireless LAN 131, and the short-range communication interface 132 in accordance with the performance of the electronic apparatus 100. For example, the electronic apparatus 100 may include one of the mobile communication interface 120, the wireless LAN 131, and the short-range communication interface 132, or a combination of the mobile communication interface 120, the wireless LAN 131, and the short-range communication interface 132. Further, the electronic apparatus 100 may connect to an external accessory (e.g., a wireless headset or a wireless keyboard) by using one of the mobile communication interface 120 and the sub-communication interface 130.

The term "communication interface" used herein includes the mobile communication interface 120 and the sub-communication interface 130.

The multimedia interface 140 may include a broadcast receiving unit (also referred to herein as a "broadcasting communication interface") 141, an audio reproducer 142, and/or a video reproducer 143. The broadcast receiving unit 141 may receive a broadcast signal (e.g., a TV broadcast signal, a radio broadcast signal, or a data broadcast signal) that is transmitted from an external broadcasting station and broadcast additional information (e.g., an electronic program guide (EPG) or an electronic service guide (ESG)) via an antenna (not shown) under the control of the controller 110. Further, the controller 110 may reproduce the broadcast signal and the broadcast additional information by using the touchscreen 190, a video coder/decoder ("codec") (not shown), and an audio codec (not shown).

The audio reproducer 142 may reproduce an audio source (e.g., an audio file having a file extension mp3, wma, ogg, or way) that has previously been stored in the storage 175 of the electronic apparatus 100 or is received from the outside by using an audio codec under the control of the controller 110.

The audio reproducer 142, according to an exemplary embodiment, may reproduce an auditory feedback (e.g., an output of an audio source that is stored in the storage 175) that corresponds to a reply that corresponds to the connection to the access point 50 by using an audio codec under the control of the controller 110.

The audio reproducer 142, according to an exemplary embodiment, may reproduce an auditory feedback (e.g., an output of an audio source that is stored in the storage 175) that corresponds to a touch or a continuous movement of the touch detected by the touchscreen 190 by using an audio codec under the control of the controller 110.

The video reproducer 143 may reproduce a digital video source (e.g., a video file having a file extension mpeg, mpg, mp4, avi, mov, or mkv) that has previously been stored in the storage 175 of the electronic apparatus 100 or is received from the outside by using a video codec under the control of the controller 110. A multimedia application that may be installed in the electronic apparatus 100 may reproduce an audio source or a video source by using an audio codec and/or a video codec. Alternatively, a multimedia application that may be installed in the electronic apparatus 100 may reproduce a video source by using a hardware codec (not shown) and/or a software codec (not shown).

The video reproducer 143, according to an exemplary embodiment, may reproduce a visual feedback (e.g., an output of a video source that is stored in the storage 175) in response to a reply that corresponds to the connection to the access point 50 by using a video codec under the control of the controller 110.

The multimedia interface 140 may include the audio reproducer 142 and the video reproducer 143 without the broadcast reception unit 141, according to the performance or the structure of the electronic apparatus 100. Alternatively, the controller 110 may include the audio reproducer 142 or the video reproducer 143 of the multimedia interface 140.

The term "audio codec" as used herein may include one or more audio codecs. The term "video codec" as used herein may include one or more video codecs.

The camera 150 may include at least one of a first camera 151 that is a front camera and a second camera 152 that is a rear camera in order to capture a still image and/or a moving image under the control of the controller 110. For example, the camera 150 may include one of the first camera 151 and the second camera 152 or both the first camera 151 and the second camera 152. Further, the first camera 151 or the second camera 152 may include an auxiliary light source (e.g., a flash 153) that provides an amount of light that is sufficient to capture an image.

The controller 110 may capture a 3D still image or moving image by using the first camera 151 that is a front camera and an additional camera (e.g., a third camera (not shown) that is disposed adjacent to the first camera 151 to be spaced by an interval that is, for example, greater than 30 mm and less than 80 mm, from the first camera 151). Alternatively, the controller 110 may capture a 3D still image or a 3D moving image by using the second camera 152 that is a rear camera and an additional camera (e.g., a fourth camera (not shown) that is disposed adjacent to the second camera 152 to be spaced by an interval that is, for example, greater than 30 mm and less than 80 mm, from the second camera 152). Further, the first and second cameras 151 and 152 may perform any of wide-angle photographing, telephotographing, and macro photographing by using an additional lens (not shown) that is attachable/detachable to/from a separate adaptor (not shown).

The GPS unit 155 periodically receives, from any of a plurality of GPS satellites, orbit signals (e.g., orbit information of the GPS satellites, time information that relates to the GPS satellites, and navigation messages).

The electronic apparatus 100 may calculate respective locations of the plurality of GPS satellites and the electronic apparatus 100 by using the signals received from the plurality of GPS satellites, and may calculate distances by using transmission/reception time differences. A location, a time, or a movement speed of the electronic apparatus 100 may be calculated by using triangulation. Input from an additional GPS satellite (not shown) may be required in order to correct an orbit or a time.

The electronic apparatus 100 may detect a location or a movement speed of the electronic apparatus 10 that is located indoors by using the access point 50. The electronic apparatus 100 may detect a location of the electronic apparatus 100 that is located indoors by using a cell-ID method that uses an identifier (ID) of the access point 50, an enhanced cell-ID method that uses the ID of the access point 50 and a received signal strength (RSS), or an angle of arrival (AoA) method that uses an angle at which a signal transmitted from the access point 50 is received by the electronic apparatus 100. Alternatively, the electronic apparatus 100 may detect a location or a movement speed of the electronic apparatus 100 that is located indoors by using a wireless beacon (not shown). It will be understood by one of ordinary skill in the art that a location of the electronic apparatus 100 that is located indoors may be detected by using any of various other methods.

The input/output interface 160 may include at least one of one or more buttons 161, a microphone 162, a speaker 163, a vibration motor 164, a connector 165, a keypad 166, and an input pen 167.

Referring to FIG. 1, the buttons 161 include a home button 161a, a menu button 161b, and a back button 161c that are disposed on a lower portion of a front surface. The buttons 161 may include a power/lock button (not shown) and at least one volume button (not shown) that are disposed on a side surface. Alternatively, the buttons 161 of the electronic apparatus 10 may include only the home button 161a, a power/lock button, and a volume button. The buttons 161 of the electronic apparatus 100 may be provided as touch buttons in a bezel outside the touchscreen 190, instead of physical buttons. Alternatively, the buttons 161 of the electronic apparatus 100 may be displayed as text, images, or icons on the touchscreen 190.

The microphone 162 converts a voice or a sound that is received from the outside into an electrical signal under the control of the controller 110. The electrical signal generated by the microphone 162 may be converted by an audio codec, and may be stored in the storage 175 or may be output via the speaker 163. One or more microphones 162 may be located on a front surface, a side surface, and a rear surface of the electronic apparatus 100. Alternatively, one or more microphones 162 may be located only on the side surface of the electronic apparatus 100.

The speaker 163 may output a sound that corresponds to any of various signals (e.g., a wireless signal, a broadcast signal, an audio source, a video file, or a photographing signal) of the mobile communication interface 120, the sub-communication interface 130, the multimedia interface 140, and the camera 150 to the outside of the electronic apparatus 100 by using an audio codec under the control of the controller 110.

The speaker 163 may output a sound (e.g., a touch sound that corresponds to a phone number input or a photographing button pressure sound) that corresponds to a function which has been performed by the electronic apparatus 100. One or more speakers 163 may be located on the front surface, the side surface, and the rear surface of the electronic apparatus 100. Referring to FIGS. 1 and 2, a plurality of the speakers 163 may be located on the front surface of the electronic apparatus 100. Alternatively, the speakers 163 may be respectively located on the front surface and the rear surface of the electronic apparatus 100. One speaker 163 may be located on the front surface of the electronic apparatus 100 and a plurality of the speakers 163 may be located on the rear surface of the electronic apparatus 100. Alternatively, the speakers 163 may be located on the side surface. When an additional speaker (not shown) is located on the side surface, the electronic apparatus 100 may provide, to the user, a sound effect that is different from that of another electronic apparatus (not shown) in which speakers are located on a front surface and a rear surface.

The speaker 163, according to an exemplary embodiment, may output an auditory feedback in response to a reply that corresponds to the connection to the access point 50 under the control of the controller 110.

The vibration motor 164 may convert an electrical signal into a mechanical vibration under the control of the controller 110. Examples of the vibration motor 164 may include a linear vibration motor, a bar-type vibration motor, a coin-type vibration motor, and a piezoelectric vibration motor. For example, when a voice call request is received from another electronic apparatus (not shown), the vibration motor 164 of the electronic apparatus 100 may operate in a vibration mode under the control of the controller 110. The electronic apparatus 100 may include one or more vibration motors 164. Further, the vibration motor 164 may vibrate the whole or a part of the electronic apparatus 100.

The vibration motor 164, according to an exemplary embodiment, may output a tactile feedback in response to a reply that corresponds to the connection to the access point 50 under the control of the controller 110. Further, the vibration motor 164 may provide any of various tactile feedbacks (e.g., an intensity of a vibration and a duration of the vibration) that are stored or received from the outside based on a control command of the controller 110.

The connector 165 may be used as an interface for connecting the electronic apparatus 100 with an external device (not shown) and/or a power source (not shown). The electronic apparatus 100 may transmit data that is stored in the storage 175 to the outside or may receive data from the outside via a wired cable that is connected to the connector 165. The electronic apparatus 100 may receive power from the power source or may charge a battery (not shown) via the wired cable that is connected to the connector 165. Further, the electronic apparatus 100 may connect to an external accessory (e.g., a speaker (not shown) or a keyboard dock (not shown)) via the connector 165.

The keypad 166 may receive the user's key input in order to control the electronic apparatus 100. Examples of the keypad 166 include a physical keypad (not shown) that is formed on the front surface of the electronic apparatus 100, a virtual keypad (not shown) that is displayed in the touchscreen 190, and a physical keypad (not shown) that may be wirelessly or wiredly connected. It will be understood by one of ordinary skill in the art that the physical keypad that is formed on the front surface of the electronic apparatus 100 may be omitted, in accordance with the performance or the structure of the electronic apparatus 100.

The input pen 167 may be configured to touch an object (e.g., a menu, text, an image, a video, a figure, an icon, or a shortcut icon) or content displayed (or configured) on a home screen 191 of the touchscreen 190 or a screen (e.g., a memo screen, a notepad screen, or a calendar screen) displayed on a handwriting/drawing application. The input pen 166 may perform handwriting or drawing (e.g., painting or sketching) on a screen (e.g., a memo screen) of a handwriting application or on a screen (e.g., a canvas screen) of a drawing application displayed on the touchscreen 190.

The input pen 167 may be used for inputting letters and so on by touching the touchscreen 190 using a capacitive method, a resistive method, or an electromagnetic resonance (EMR) method or by using a displayed virtual keypad. Examples of the input pen 167 may include a stylus pen and a haptic pen (not shown) in which a vibration device (e.g., an actuator or a vibration motor) is provided and vibrates. Further, the input pen 167 may operate the vibration device in response to not only control information received from the electronic apparatus 100 but also sensing information detected by a sensor (e.g., an acceleration sensor (not shown)) that is provided in the input pen 167.

When the input pen 167 is taken out from an insertion hole (not shown), the controller 110 may execute a set handwriting/drawing application.

Examples of the input pen 167 may include the user's finger (e.g., the thumb). For example, handwriting or drawing may be performed by using the user's finger via an application that is displayed on the touchscreen 190 by using a capacitive method (or a resistive method).

It will be understood by one of ordinary skill in the art that a shape (e.g., a circular cross-sectional shape or a polygonal cross-sectional shape) and/or a structure (e.g., the existence of a battery (not shown)) of the input pen 167 that corresponds to the insertion hole of the electronic apparatus 100 may vary, in accordance with the performance or the structure of the electronic apparatus 100.

The sensor 170 includes at least one sensor that detects a state of the electronic apparatus 100. For example, the sensor 170 may include a proximity sensor 171 that detects whether the user approaches the electronic apparatus 100, an illumination sensor 172 that detects an amount of light around the electronic apparatus 100, and a gyro sensor 173 that detects a direction of motion by using a rotational inertia of the electronic apparatus 100. Further, the sensor 170 may include any of an acceleration sensor (not shown) that detects acceleration applied in three axes (e.g., x, y, and z-axes) to the electronic apparatus 100, a gravity sensor that detects a direction in which gravity is applied, and/or an altimeter that detects a height by measuring an atmospheric pressure.

The sensor 170 may measure acceleration due to motion and acceleration due to gravity of the electronic apparatus 100. In addition, the sensor 170 may further include a fingerprint sensor (not shown) that detects the user's fingerprint and/or a heart rate sensor (not shown) that detects the user's heart rate.

At least one sensor included in the sensor 170 detects a state of the electronic apparatus 100, generates an electrical signal that corresponds to the detected state, and transmits the electrical signal to the controller 110. It will be understood by one of one of ordinary skill in the art that at least one sensor included in the sensor 170 may be added or deleted, in accordance with the performance of the electronic apparatus 100.

The storage 175 may store signals or data that are input/output in response to operations of the mobile communication interface 120, the sub-communication interface 130, the multimedia interface 140, the camera 150, the GPS unit 155, the input/output interface 160, the sensor 170, and the touchscreen 190 under the control of the controller 110. The storage 175 may store any of a GUI which relates to an application that is provided by a manufacturer or is uploaded from the outside and a control program for controlling the electronic apparatus 100 or the controller 110, images for providing the GUI, user information, documents, databases, and/or related data.

The storage 175 may store at least one initial screen (e.g., a GUI) that corresponds to an initial setup. The initial screen may include a plurality of pages.

The storage 175, according to an exemplary embodiment, may store electronic apparatus information, audio device information that corresponds to the audio device 200 that is connected via a second communication interface, or access point information that corresponds to the access point 50 that is connected via a first communication interface.

The storage 175 may store access point connection information that corresponds to the access point 50 in order to set a network of the audio device 200.

The storage 175 may store a password that is usable for establishing a connection to the access point 50.

The storage 175 may store first through seventh touches, first through seventh touch positions, and/or first through seventh touch position information.

The storage 175 may store a visual feedback (e.g., a video source) that is output to the touchscreen 190 and may be perceived by the user, an auditory feedback (e.g., a sound source) that is output from the speaker 163 and may be perceived by the user, and a tactile feedback (e.g., a haptic pattern) that is output from the vibration motor 164 and may be perceived by the user in response to a reply that corresponds to success in establishing a connection to the audio device 200 and a reply that corresponds to success in establishing a connection to the access point 50.

The storage 175 may store a feedback time (e.g., 300 msec) for which a feedback is provided to the user.

The term "storage," according to an exemplary embodiment, collectively includes the storage 175, and the ROM 112 or the RAM 113 included in the controller 110 or a memory card (not shown, e.g., a micro secure digital (SD) card or a memory stick) provided in the electronic apparatus 100. Examples of the storage may include a nonvolatile memory, a volatile memory a hard disk drive (HDD), and a solid-state drive (SSD).

The power supply 180 may supply power to the elements 120 through 195 included in the electronic apparatus 100 under the control of the controller 110. The power supply 180 may supply, to the electronic apparatus 100, power that is input from an external power source (not shown) via a wired cable (not shown) that is connected to the connector 165 under the control of the controller 110. Further, the power supply 180 may supply power and may charge one or more batteries (not shown) under the control of the controller 110. The one or more batteries may be disposed between the rear surface and the touchscreen 90 that is disposed on the front surface.

The power supply 180 may charge the one or more batteries by using a wireless method (e.g., a magnetic resonance method, an electromagnetic radiation method, or a magnetic induction method) under the control of the controller 110.

The touchscreen 190 includes a touch panel (not shown) that receives a touch input and a display panel (not shown) that displays an image. The touchscreen 190 may provide a GUI that corresponds to any of various services (e.g., a voice call, a video call, data transmission, broadcast reception, photographing, video watching, or execution of an application) to the user. The touchscreen 190 transmits an analog signal that corresponds to a single touch or a multi-touch that is input via the GUI or the home screen 191 to the touchscreen controller 195. The touchscreen 190 may receive the single touch or the multi-touch via the user's body part (e.g., a finger such as the thumb) or the input pen 167.

The display panel includes a plurality of pixels and displays an image via the pixels. Examples of the display panel include a liquid crystal display (LCD), an OLED, and an LED. The display panel may display various images and a plurality of objects in accordance with various operation states of the electronic apparatus 100 or execution of an application or service.

Examples of a touch, according to an exemplary embodiment, are not limited to contact between the touchscreen 190 and the user's body part or the input pen 167, and also include non-contact. Examples of non-contact may include hovering with an interval of 50 mm or less between the touchscreen 190 and the user's body part or the input pen 167. It will be understood by one of ordinary skill in the art that a non-contact interval that may be detected by the touchscreen 190 may vary based on the performance or the structure of the electronic apparatus 100.

The touchscreen 190 may use, for example, a resistive method, a capacitive method, an infrared method, or an acoustic wave method. Alternatively, the touchscreen 190 may use an EMR method. When the touchscreen 190 uses an EMR method, the touchscreen 190 further includes a separate EMR touch panel (not shown) which is configured for receiving an input of an input pen (not shown) and which includes a resonance circuit that resonates in an EMR loop coil.

The touchscreen 190, according to an exemplary embodiment, may display a visual feedback in response to a reply that corresponds to the connection to the access point 50 under the control of the controller 110.

The touchscreen controller 195 converts an analog touch that corresponds to a single touch or a multi-touch received from the touchscreen 190 into a digital signal, and transmits the digital signal to the controller 110. The controller 110 may calculate X and Y coordinates that correspond to a touch position on the touchscreen 190 by using the digital signal received from the touchscreen controller 195.

The controller 110 may control the touchscreen 190 by using the digital signal received from the touchscreen controller 195. For example, the controller 110 may distinctively display a shortcut icon (e.g., 192*b* of FIG. 1) displayed on the touchscreen 190 so that the shortcut icon is distinguished from other shortcut icons (e.g., 192*a*, 192*c*, 192*d*, 192*e*, 192*f*, 192*g*, 192*h*, and 192*i*) in response to an input touch, or may execute an application that corresponds to the selected shortcut icon 192*b* (see FIG. 1) and display an application screen on the touchscreen 190.

One or more touchscreen controllers 195 may be provided. The touchscreen controller 195 may be included in the controller 110 in accordance with the performance or the structure of the electronic apparatus 100.

When the touchscreen 190 uses an EMR method, the touchscreen controller 195 converts an analog signal that corresponds to a touch received from the touchscreen 190 into a digital signal, and transmits the digital signal to the controller 110. The controller 110 may calculate X and Y coordinates that corresponds to a touch position on the touchscreen 190 by using the digital signal received from the touchscreen controller 195. Further, when the touchscreen 190 uses an EMR method, a touchscreen controller (not shown) that uses an EMR method may be used.

The electronic apparatus 100 may include one or more touchscreens 190. The touchscreens 190 may be respectively located in housings (not shown) and the housings may be connected to one another by using hinges (not shown). Alternatively, a plurality of the touchscreens 190 that are flexible may be located in one housing. The plurality of flexible touchscreens 190 may include one display panel and a plurality of touch panels. The plurality of flexible touchscreens 190 may include one touch panel that corresponds to a plurality of display panels. Alternatively, the plurality of flexible touchscreens 190 may include a plurality of touch panels which respectively correspond to a plurality of display panels.

It will be understood by one of ordinary skill in the art that at least one of the elements included in the electronic apparatus 100 of FIG. 1 may be added or deleted in accordance with the performance of the electronic apparatus 100.

Referring to FIG. 2, the audio device 200 is wirelessly connected to the access point 50 or the electronic apparatus 100 via a communication interface 230. The audio device 200 may output audio that is received from the access point 50 or the electronic apparatus 100. The audio device 200 may output an audio stream that is received from the electronic apparatus 100 or the access point 50 that is wirelessly connected to the audio device 100.

The audio device 200 may include a controller 210, the communication interface 230, a light receiver 250, an input/output interface 260, a display 270, a speaker 275, a storage 280, and/or a power supply 290.

The controller 210 includes a processor 211. The controller 210 may include the processor 211 and a ROM 212 in which a control program for controlling the audio device 200 is stored. Alternatively, the controller 210 may include the processor 211, the ROM 212, and a RAM 213 in which a signal or data which is received from the outside of the audio device 200 is stored and/or data that corresponds to various operations performed by the audio device 200 is stored. The controller 210 may include an audio codec (not shown).

The controller 210 controls an overall operation of the audio device 200 and the flow of signals between the elements 230 through 290 included in the audio device 200 and processes data. The controller 210 controls the power supply 290 to supply power to the elements 230 through 280.

The controller 210 may output a received audio via the speaker 275. Alternatively, the controller 210 may output a received audio to an additional speaker (not shown) via the communication interface 230 or via the input/output interface 260.

The controller 210 controls a first communication interface that is wirelessly connected to the access point 50 by using an original audio device name and a second communication interface that is wirelessly connected to the electronic apparatus 100 by using a changed audio device name, receives access point connection information that corresponds to the access point 50 from the electronic apparatus 100 that is connected via the second communication interface, and connects to the access point 50 via the first communication interface by using the received access point connection information. The audio device 200 includes the original audio device name and the changed audio device name.

When power is first supplied to the audio device 200, the controller 210 may control the original audio device name of the audio device 200 to be changed to the changed audio device name.

When the access point connection information is received from the electronic apparatus 100, the controller 210 may control the changed audio device name of the audio device 200 to be changed to the original audio device name.

The controller 210 may control the access point 50 to be connected by using the access point connection information and the original audio device name via the first communication interface.

It will be understood by one of ordinary skill in the art that a configuration and an operation of the controller 210 may be changed in various ways.

The communication interface 230 may wirelessly connect to the electronic apparatus 100 under the control of the controller 210. The communication interface 230 may include at least one of a wireless LAN 231, a short-range communication interface 232, and a wired Ethernet interface 233. The communication interface 230 may receive a control signal from the access point 50 or the electronic apparatus 100 under the control of the controller 210. Further, the communication interface 230 may receive audio data that corresponds to audio from the access point 50 or the electronic apparatus 100 under the control of the controller 210.

The light receiver 250 receives an optical signal (including a control signal) from a remote controller (not shown) via a light window (not shown). The light receiver 250 may receive an optical signal that corresponds to a user input (e.g., a touch, a pressure, a touch gesture, a voice, or a motion) from the remote controller. The received optical signal may be converted and transmitted to the controller 210. The control signal may be extracted from the received optical signal by the controller 210.

The input/output interface 260 may receive audio data that corresponds to audio (e.g., a sound or music) from the outside under the control of the controller 210. The input/output interface 260 may receive video data that corresponds to a video from the outside under the control of the controller 210. Further, the input/output interface 260 may output audio data that corresponds to audio (e.g., a sound or music) to the outside under the control of the controller 210. The input/output interface 260 may output video data That corresponds to a video to the outside under the control of the controller 210.

The input/output interface 260 may include any of a high-definition multimedia interface (HDMI) port 261, a Sony/Philips digital interface format (S/PDIF) port 262, a universal serial bus (USB) port 263, and/or an audio-in jack 264. It will be understood by one of ordinary skill in the art that a configuration and an operation of the input/output interface 260 may be changed in various ways.

The display 270 may display video or text information (e.g., a title of a song, a volume, or a sound output effect) under the control of the controller 210. The display 270 may use, for example, an LCD method, an OLED method, a plasma display panel (PDP) method, or a vacuum fluorescent display (VFD) method. It will be understood by one of ordinary skill in the art that video and/or text information that may be displayed may vary based on a display method.

The display 270 may display text, an icon, or a symbol (e.g., "□" which corresponds to a reproduction operation or "■" which corresponds to a stop operation) that corresponds to an external electronic apparatus (e.g., the electronic apparatus 100, a memory card, or a remote controller (not shown)) that is wirelessly connected to the audio device 200 under the control of the controller 210.

When a USB memory (not shown) that is a memory card is connected to the audio device 200 via the USB port 263, the display 270 may display text such as, for example, "USB ready" or "title of a song" under the control of the controller 210.

When the electronic apparatus 100 is connected to the audio device 200 via short-range communication, the display 270 may display text such as, for example, "BT connected" or "NFC connected" under the control of the controller 210.

When an optical signal that is output from the remote controller is received by the light receiver 250 of the audio device 200, the display 270 may display text, an icon, or a symbol that corresponds to a power-on event for turning on a power supply to the audio device 200, a power-off event for turning off a power supply to the audio device 200, and/or a volume control event that indicates a controlled volume.

The text, the icon, or the symbol displayed on the display 270 may be moved in one direction under the control of the controller 210. Alternatively, the text, the icon, or the symbol displayed on the display 270 may be moved in one direction while blinking under the control of the controller 210.

When a power supply to the audio device 200 is turned on or off, the display 270 may display a visual feedback (e.g., text, an icon, or a symbol) that corresponds to the power supply under the control of the controller 210.

The display 270, according to an exemplary embodiment, may output a visual feedback that corresponds to a connection to the electronic apparatus 100 or the access point 50 under the control of the controller 210 of the audio device 200.

The speaker 275 outputs a received audio under the control of the controller 210. The speaker 275 may output audio (e.g., a voice, music, a sound, or an audio stream) that is received via the communication interface 230 or via the input/output interface 260. The speaker 275 may have any of a 1-channel system, a 2-channel system, or a 2.1-channel system. Alternatively, it will be understood by one of ordinary skill in the art that the speaker 275 may have, but is not limited to, any of a 4-channel system, a 4.1-channel system, a 5.1-channel system, a 6.1-channel system, a 7.1-channel system, a 9.1-channel system, or a 11.2-channel system.

The controller 210 may up-mix audio (e.g., an audio from a 2.0-channel system) and may output the up-mixed audio to speakers (and additional speakers (not shown)) of any of a 2.1-channel system, a 4-channel system, a 5-channel system, a 5.1-channel system, or a 7.1-channel system. The controller 210 may down-mix audio (e.g., an audio from a 7.1-channel system) and may output the down-mixed audio to speakers of any of a 2-channel system, a 2.1-channel system, or a 5.1-channel system. The controller 210 may output a received audio in consideration of the number of the speakers 275 and additional speakers. For example, when the number of speakers that corresponds to a received audio is equal to the number of speakers of a 5.1-channel system, the controller 210 may output the received audio to the speakers 275 (having, for example, a 5.1-channel system) of the audio device 200. Alternatively, when the number of speakers that corresponds to a received audio is equal to the number of speakers of a 5.1-channel system, the controller 210 may add additional speakers (having, for example, a 3-channel system) to the speakers 275 (having, for example, a 2.1-channel system) of the audio device 200 and may output the received audio to the speakers collectively having a 5.1-channel system.

The controller 210 may provide any of various audio output effects (e.g., a movie, sports, a rock concert, and an orchestra) to the user, based on the number of the speakers 275. Further, the controller 110 may provide, to the user, any of various audio output effects (e.g., a movie, sports, a rock concert, and an orchestra) based on the total number of the speakers 275 and additional speakers that are connected via the input/output interface 260.

The speaker 275 may output audio that is stored in the storage 280 under the control of the controller 210. The audio device 200 may output audio to an external electronic apparatus (not shown) via the input/output interface 260. For example, the controller 210 may output audio to an additional speaker and/or to the electronic apparatus 100.

The speaker 275, according to an exemplary embodiment, may output an auditory feedback that corresponds to a connection to either of the electronic apparatus 100 or the access point 50 under the control of the controller 210. The speaker 275 may output an auditory feedback that corresponds to text, an icon, or a symbol displayed on the display 270 under the control of the controller 210.

The storage 280 may store various data and a control program for driving and controlling the audio device 200 under the control of the controller 210. The storage 280 may store input/output signals or data that respectively correspond to operations of the communication interface 230, the light receiver 250, the input/output interface 260, the display 270, the speaker 275, and the power supply 180.

Examples of the storage 280 may include a nonvolatile memory, a volatile memory, an HDD, and an SSD.

The storage 280 may store reference information that corresponds to whether power is first supplied to the audio device 200. The reference information is also referred to as out-of-box information. The reference information may be set as a flag when a product is manufactured. Once the reference information is set, it is indicated that power is first supplied to the audio device 200. The controller 210 may clear the reference information that is stored in the storage 280 after power is first supplied.

When it is determined that the supplying of power to the audio device 200 has begun, the controller 210 may discover the electronic apparatus 100 by using the reference information and the communication interface 230.

The storage 280 may store audio device name information.

The storage 280 may store access point connection information that is received from the electronic apparatus 100.

The storage 280 may store any of an image, a symbol, and/or text that may be displayed on the display 270.

The storage 280 may store a video and/or an image that corresponds to a visual feedback. In addition, the storage 280 may store a sound that corresponds to an auditory feedback.

The power supply 290 supplies power that is input from an external power source to the elements 230 through 280 included in the audio device 200 under the control of the controller 210. Alternatively, the power supply 180 may supply power that is supplied from one or more batteries (not shown) disposed in the audio device 200 to the elements 230 through 280 under the control of the controller 210.

At least one element of the elements (e.g., 230 through 280) included in the audio device 200 of FIGS. 1 and 2 may be added or deleted in accordance with the performance of the audio device 200. Further, it will be understood by one of ordinary skill in the art that locations of the elements (e.g., 230 through 280) may vary based on the performance or the structure of the audio device 200.

Figure 3:
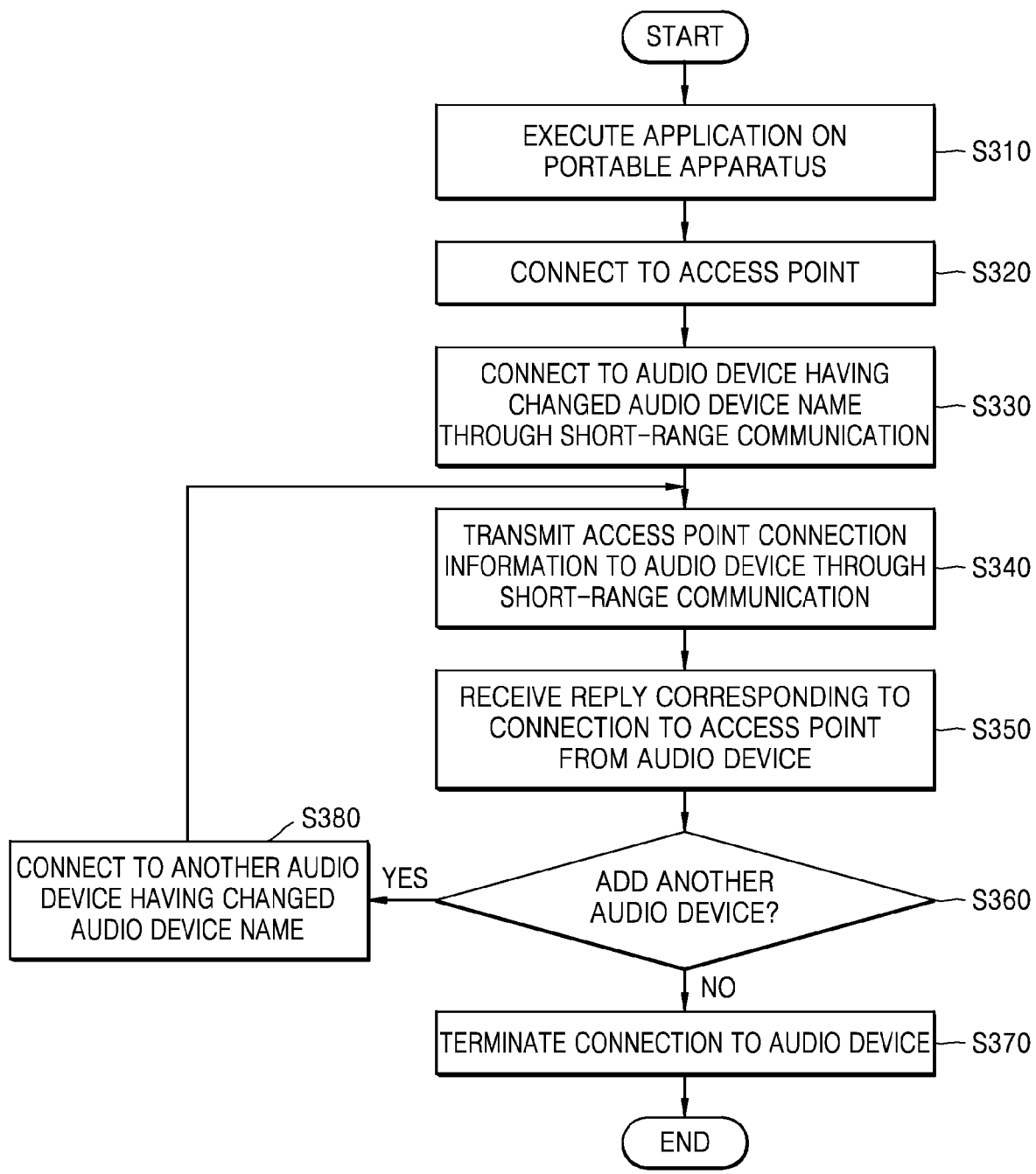
FIG. 3 is a flowchart of a method that is performable by the electronic apparatus for setting a network of the audio device, according to an exemplary embodiment.

FIG. 3 is a flowchart of a method that is performable by the electronic apparatus 100 to set a network of the audio device 200, according to an exemplary embodiment.

Figure 4:
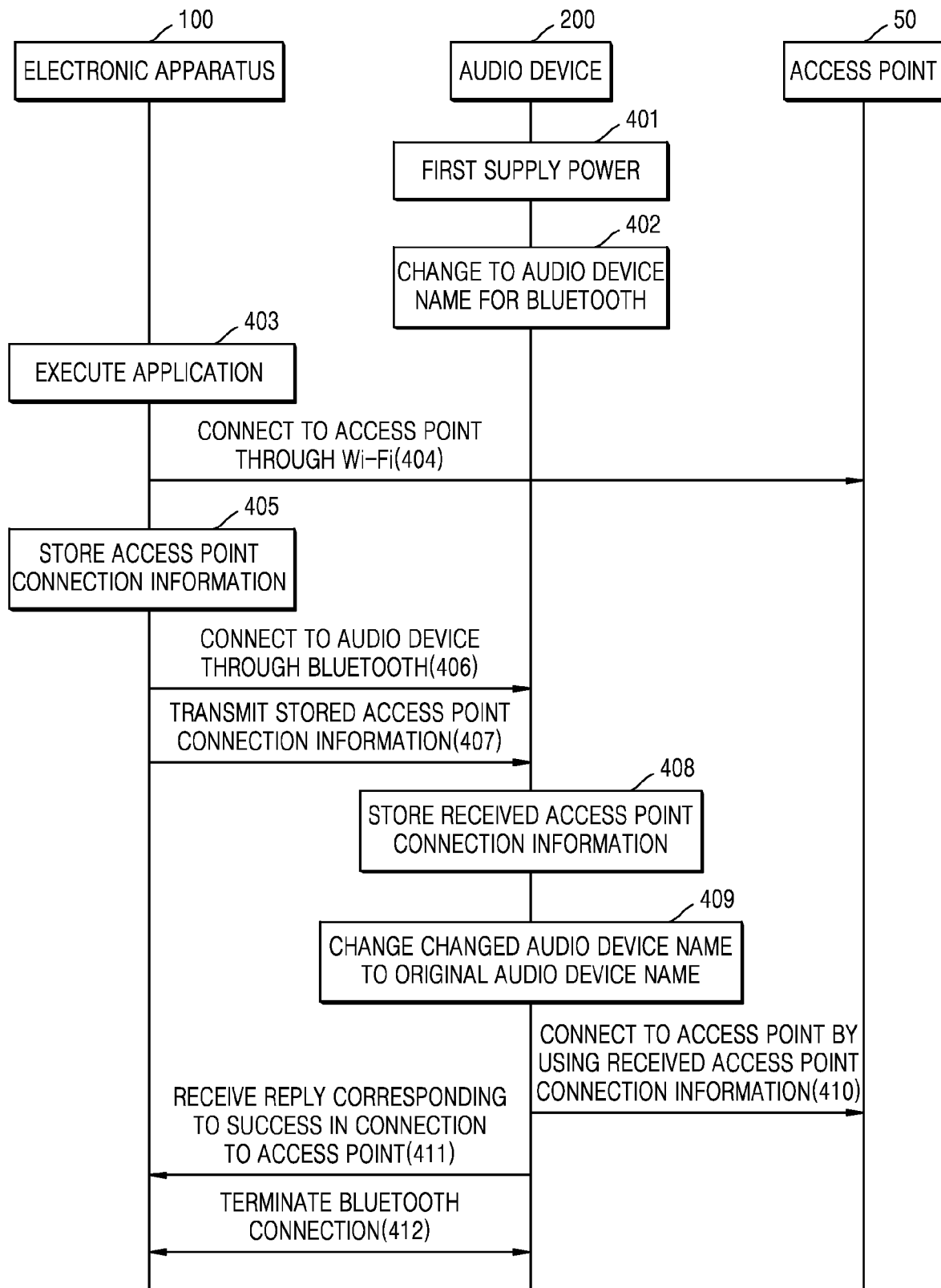
FIG. 4 is a sequence diagram of a method that is performable by the electronic apparatus for setting a network of the audio device, according to an exemplary embodiment.

FIG. 4 is a sequence diagram of a method that is performable by the electronic apparatus 100 to set a network of the audio device 200, according to an exemplary embodiment.

FIGS. 5A through 5J are views for explaining a method that is performable by the electronic apparatus 100 to set a network of the audio device 200, according to an exemplary embodiment.

In operation S310 of FIG. 3, an application is executed by the electronic apparatus 100.

Figure 5A:
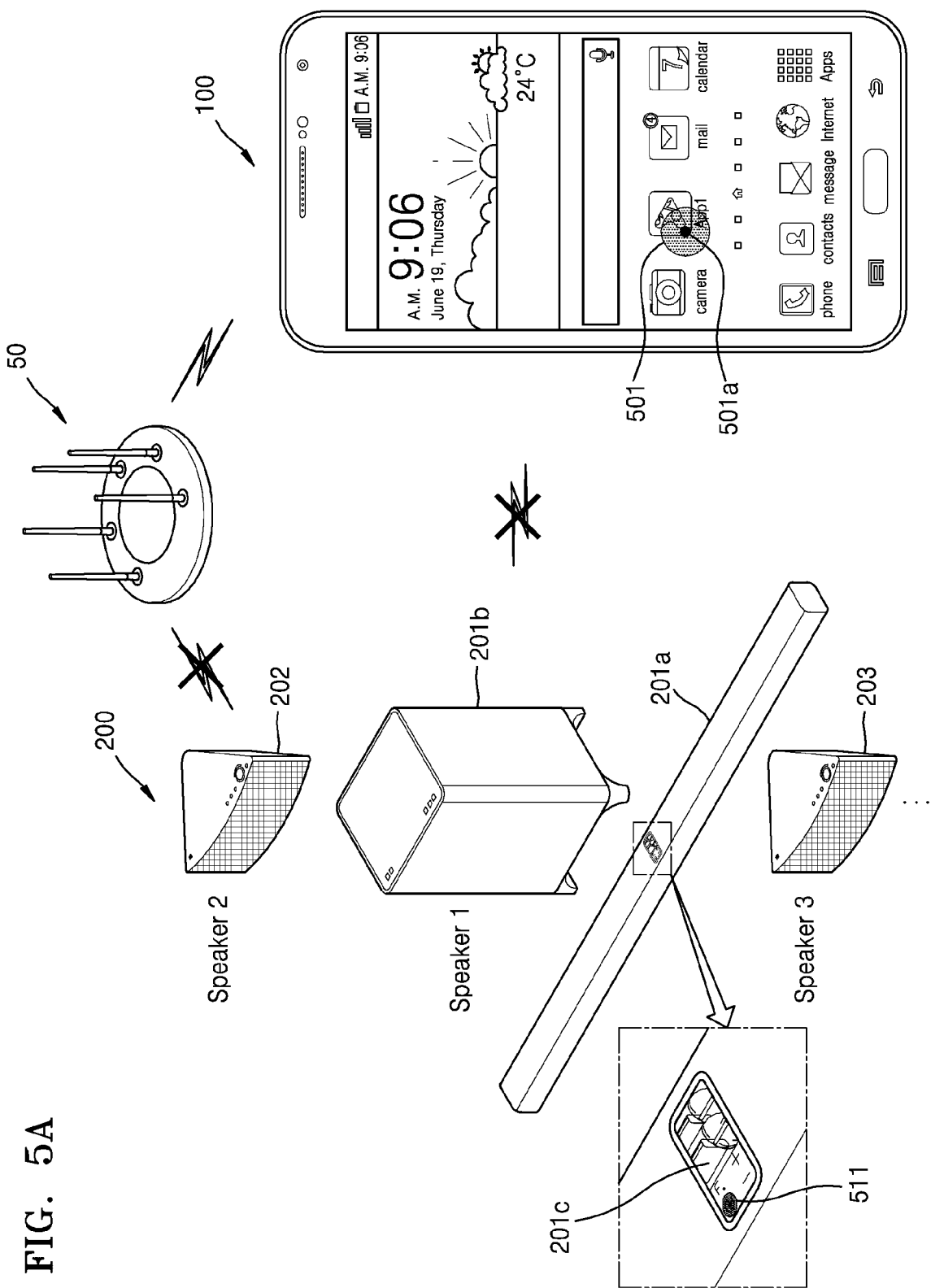
FIGS. 5A through 5J are views for explaining a method that is performable by the electronic apparatus for setting a network of the audio device, according to an exemplary embodiment.

Referring to FIGS. 4 and 5A, in operation 403, an application for controlling a network of the audio device 200 to be set is executed by the electronic apparatus 100.

A user performs a first touch 501 on the shortcut icon 192b that corresponds to the application that is being executed on a screen of the electronic apparatus 100. The controller 110 may detect the first touch 501 by using the touchscreen 190 and the touchscreen controller 195. The controller 110 may calculate a first touch position 501a (e.g., X1 and Y1 coordinates) that correspond to the first touch 501 by using an electrical signal that is received from the touchscreen controller 195.

The controller 110 may store first touch position information that corresponds to the first touch position 501a in the storage 175. The stored first touch position information may include a touch identification (ID) for history management, a touch position, a touch detection time, and/or touch information (e.g., a touch pressure, a touch direction, or a touch duration).

Figure 5B:
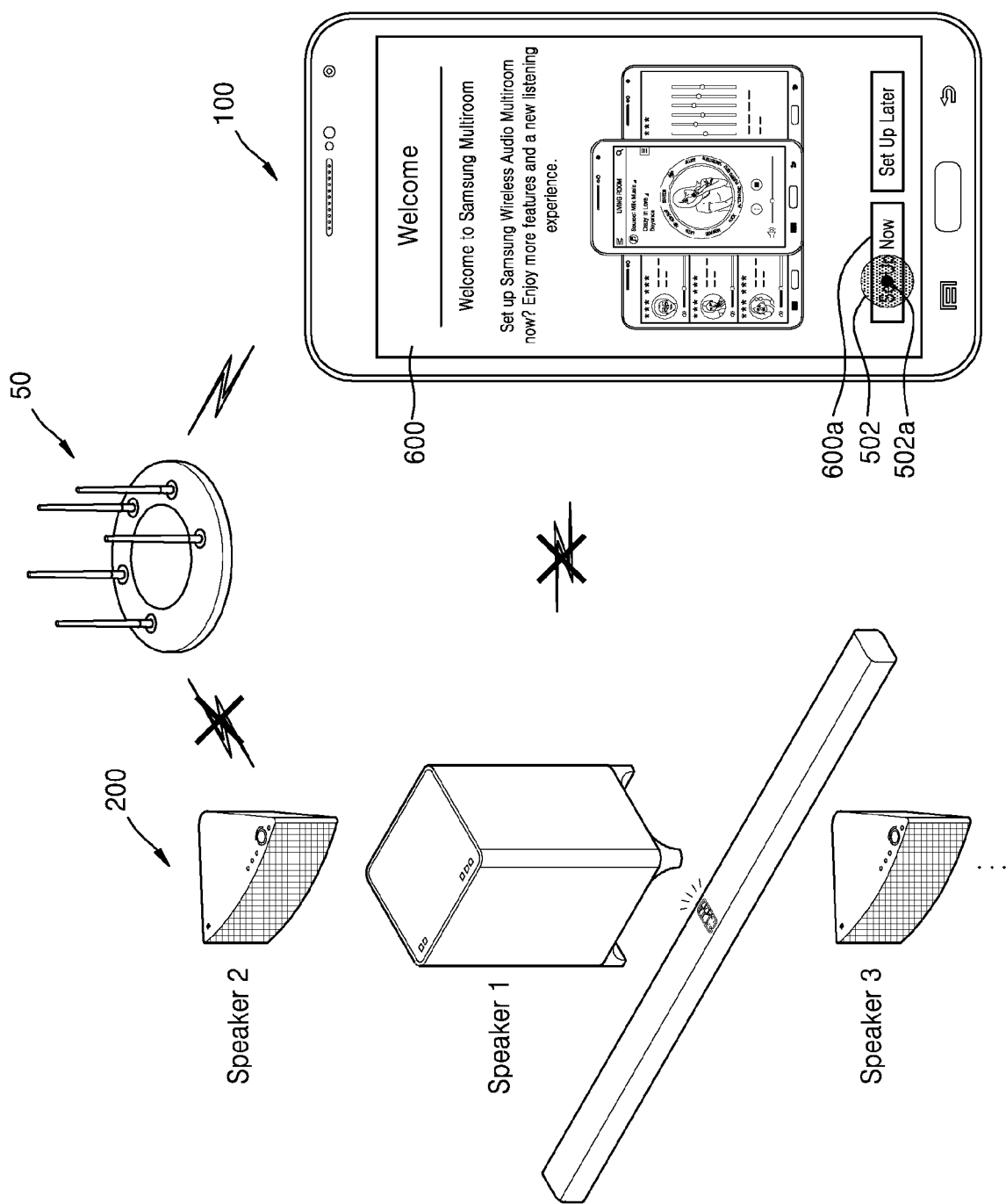

The controller 110 may execute an application (e.g., App1) that corresponds to the first touch 501 in the electronic apparatus 100. Referring to FIG. 5B, the controller 110 may display an application screen 600 of the application that corresponds to the first touch 501 on the touchscreen 190 of the electronic apparatus 100. The application screen 600 may display a message for asking whether to start network setting of the audio device 200, an item "Set Up Now" 600a which indicates that the network setting is to start now and an item "Set Up Later" which indicates that network setting is to start at a later time. The user may start the network setting of the audio device 200 via the application screen 600.

The user performs a second touch 502 on the item "Set Up Now" 600a on the application screen 600. The controller 110 may detect the second touch 502 by using the touchscreen 190 and the touchscreen controller 195. The controller 110 may calculate a second touch position 502a (e.g., X2 and Y2 coordinates) that correspond to the second touch 502 by using an electrical signal that is received from the touchscreen controller 195.

The controller 110 may store second touch position information that corresponds to the second touch position 502a in the storage 175. The stored second touch position information may include a touch ID for history management, a touch position, a touch detection time, and/or touch information (e.g., a touch pressure, a touch direction, or a touch duration).

Figure 5C:
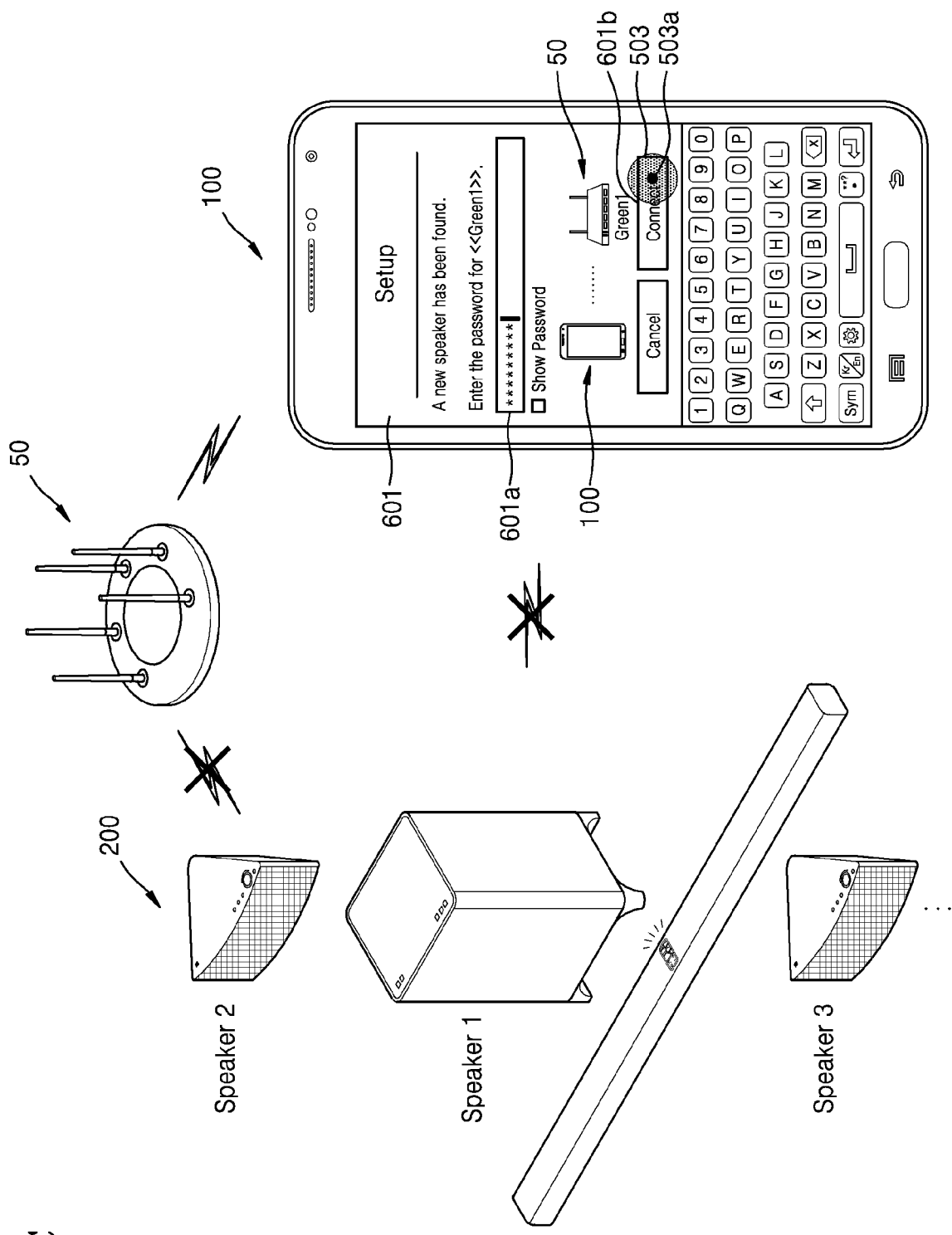

Referring to FIG. 5C, the controller 110 may display an application screen 601 that corresponds to the second touch 502 on the electronic apparatus 100. The application screen 601 may include a user interface that is provided to receive a user input for establishing a connection to the electronic apparatus 100 and the access point 50. The application screen 601 may display a message which indicates that a new audio device has been discovered, a window for inputting a password 601a for connecting to the access point 50 having an ID "Green1", an image that indicates a connection to the electronic apparatus 100 and the access point 50, and an item 601b for ordering to connect to the electronic apparatus 100 and the access point 50.

Referring to FIG. 4, in operation 401, power is first supplied to the audio device 200. A power cord is connected by the user to a power cord terminal (not shown) that is disposed on a rear surface of the audio device 200. Referring to FIG. 5A, the user performs a 11$^{th}$ touch 511 on a power button of the audio device 200. The controller 210 may supply power to the audio device 200 in response to the 11$^{th}$ touch 511. Further, the user may first supply power to the audio device 200 by using any of a remote controller (not shown), a voice, or a motion.

The controller 210 of the audio device 200 may determine whether power is first supplied to the audio device 200 by using reference information that is stored in the storage 280. Further, the controller 210 may determine whether power supplying has begun by referring to network setting information that is stored in the storage 280. When there is no network setting information stored in the storage 2890, the controller 210 may determine that the power supply has commenced.

In operation 402, when power is first supplied to the audio device 200, the controller 210 may change an original audio device name that is stored in the storage 280 in order to wirelessly connect to the electronic apparatus 100. The controller 210 may change the original audio device name to an audio device name that corresponds to each of various communication methods that are supported by the communication interface 230. For example, when the electronic apparatus 100 and the audio device 200 are connected to each other via Bluetooth, the controller 210 of the audio device 200 may change the original audio device name to an audio device name that relates to Bluetooth. When the electronic apparatus 100 and the audio device 200 are connected to each other via short-range communication other than Bluetooth, the controller 210 of the audio device 200 may change the original audio device name to an audio device name that relates to short-range communication. When power is supplied to the audio device 200, power may be supplied to a light source (not shown) that is provided in the audio device 200, and light may be emitted through a display window 201c.

The controller 210 may maintain an audio device name (hereinafter, referred to as "changed audio device name") that is obtained by changing the original audio device name in order to wirelessly connect to the electronic apparatus 100, for a preset period of time. For example, the preset period of time may include a period of time for which the electronic apparatus 100 and the audio device 200 are wirelessly connected. The preset period of time may include a period of time that elapses until reception of network setting information from the electronic apparatus 100 is completed. The preset period of time may include a period of time that elapses until the access point 50 is connected by using the received network setting information. The preset period of time may include a period of time that elapses until the connection to the access point 50 by using the received network setting information is completed. When the preset period of time elapses, the controller 210 may return the changed audio device name to the original audio device name.

The controller 210 may store the changed audio device name in the storage 280. The controller 210 may store the original audio device name and the changed audio device name as audio device name information in the storage 280.

Table 1 shows an example of the type of audio device name information that may be stored in the storage 280.

TABLE 1

| Original audio device name | Affix | Changed audio device name |
|---|---|---|
| [Samsung]Soundbar | . | [Samsung]Soundbar. |
| [Samsung]Soundbar | , | [Samsung]Soundbar, |

TABLE 1-continued

| Original audio device name | Affix | Changed audio device name |
|---|---|---|
| [Samsung]Soundbar | _ | [Samsung]Soundbar_ |
| [Samsung]Soundbar | (space) | [Samsung]Soundbar |
| [Samsung]Soundbar | - | [Samsung]-Soundbar |
| ... | ... | ... |

The audio device name information may include a plurality of items which indicate the original audio device name, an affix, and the changed audio device name. Examples of the affix may include a suffix and/or a prefix that may be added to the original audio device name. The affix may include text, an integer, and/or a symbol included in the ASCII code. Alternatively, the affix may include text, an integer, and/or a symbol included in the Unicode.

It will be understood by one of ordinary skill in the art that the audio device name information is not limited to the plurality of items shown in Table 1, and may include items which indicate any of various pieces of information.

When the audio device name of the audio device 200 is changed, the controller 210 activates the short-range communication interface 232 in order to set a network of the audio device 200. When the audio device name of the audio device 200 is changed, the controller 3210 may activate a Bluetooth module (not shown).

In operation S320 of FIG. 3, the access point 50 is connected.

Referring to FIGS. 4 and 5C, in operation 404, the electronic apparatus 100 and the access point 50 are connected to each other via Wi-Fi.

On the application screen 601 of the electronic apparatus 100 of FIG. 5C, the user inputs the password 601a of the access point 50 (which has a service set identifier (SSID) of green1) that is to be connected to the electronic apparatus 100. Any of various authentication methods may be input via the electronic apparatus 100, in accordance with a security authentication method (e.g., WPA, WPA2, TKIP, or AES) of the access point 50.

Further, it will be understood by one of ordinary skill in the art that when the electronic apparatus 100 and the access point 50 are first connected to each other, the electronic apparatus 100 may first discover and select the access point 50.

The user performs a third touch 503 on the item "Connect 601b" in order to connect the electronic apparatus 100 with the access point 50. The controller 110 may detect the third touch 503 by using the touch screen 190 and the touchscreen controller 195. The controller 110 may calculate a third touch position 503a (e.g., X3 and Y3 coordinates) that corresponds to the third touch 503 by using an electrical signal that is received from the touchscreen controller 195.

The controller 110 may store third touch position information that corresponds to the third touch position 503a in the storage 175. The stored third touch position information may include any of a touch ID for history management, a touch position, a touch detection time, and/or touch information (e.g., a touch pressure, a touch direction, or a touch duration).

The controller 110 may connect the electronic apparatus 100 to the access point 50 in response to the third touch 503.

Referring to FIG. 4, in operation 405, the controller 110 may store access point connection information that corresponds to the connected access point 50 in the storage 175.

The access point connection information may include, for example, any of an SSID (e.g., green1), a media access control (MAC) address, and/or a security method (e.g., a WPA2-based method). Further, the access point connection information may include the password 601a that is input by the user.

It will be understood by one of ordinary skill in the art that an item included in the access point connection information may be added, deleted, or changed in accordance with a connection method between the electronic apparatus 100 and the access point 50.

When the access point connection information is stored, the controller 110 may maintain or terminate the connection to the access point 50.

Figure 5D:
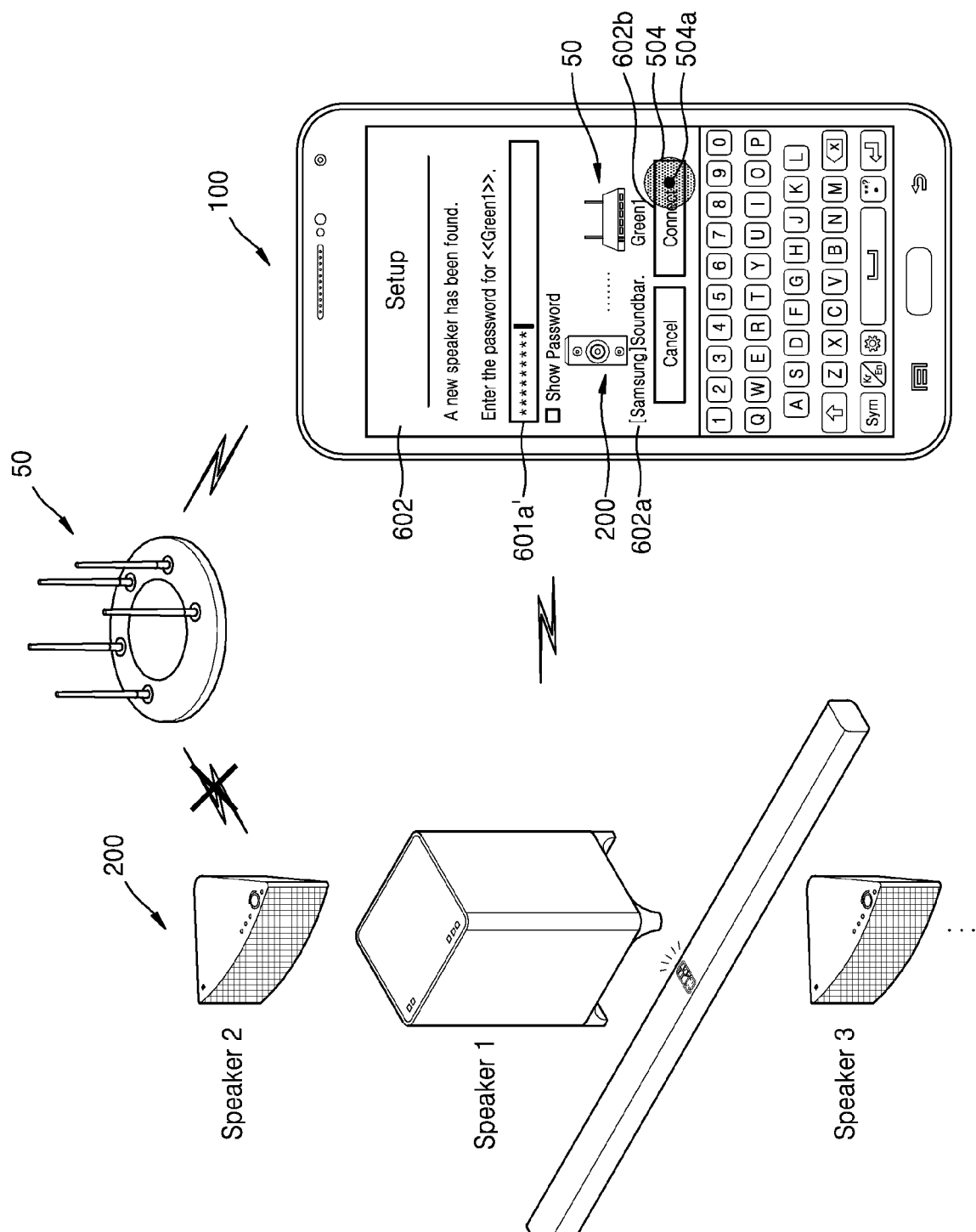

The controller 110 may provide, to the touchscreen 190 of the electronic apparatus 100, a user interface that is provided to receive a user input that relates to establishing wireless connection to the audio device 200 and the access point 50 in response to the third touch 503. Referring also to FIG. 5D, the controller 110 of the electronic apparatus 100 may provide an application screen 603 as the user interface that is provided to receive the user input that relates to establishing the wireless connection to the audio device 200 and the access point 50.

In operation S330 of FIG. 3, the audio device 200 having the changed audio device name is connected via short-range communication.

Referring to FIGS. 4 and 5D, in operation 406, the electronic apparatus 100 is connected to the audio device 200 having a changed audio device name 602a (e.g., [Samsung] Soundbar.") via short-range communication.

The controller 110 may discover the audio device 200 (e.g., the audio device 200 having the changed audio device name) by using activated short-range communication (e.g., Bluetooth). When power is first supplied to the audio device 200, the controller 110 may inquire and page the audio device 200 having the changed audio device name.

The controller 110 may preferentially discover the audio device 200 having an audio device name that includes an affix. The controller 110 may select the audio device 200 having the audio device name that includes the affix in order to set a network. The controller 110 may preferentially select the audio device 200 having the audio device name that includes the affix (for example, under preset conditions) in order to set a network.

When the electronic apparatus 100 and the audio device 200 having the changed audio device name 602a are connected to each other, referring to FIG. 5D, the controller 110 may display an image of the audio device 200 having the changed audio device name 602a on the application screen 602. Further, the controller 110 may display an image of another audio device 200 (not shown) having the original audio device name on the application screen 602. In addition, when a plurality of the audio devices 200 are discovered, the controller 110 may display an image of the audio device 200 having an audio device name that includes an affix preferentially (for example, with high priority).

The controller 110 may store audio device information that corresponds to the connected audio device 200 in the storage 175. The audio device information may include, for example, any of an SSID, a MAC address, operation information (e.g., a busy mode or a standby mode), and/or context information.

When the electronic apparatus 100 and the audio device 200 having the changed audio device name 602a are not connected to each other, the controller 110 may not display an image (including text or an icon) that corresponds to the audio device 200 having the changed audio device name 602a on the application screen 602. The controller 110 may continuously attempt to connect to the audio device 200 having the changed audio device name 602a.

In operation S340 of FIG. 3, access point connection information is transmitted to the audio device 200 via short-range communication.

Referring to FIGS. 4 and 5D, in operation 407, the controller 110 may transmit the stored access point connection information to the audio device 200 having the changed audio device name via a Bluetooth packet (not shown). The Bluetooth packet includes an access code (72 bits) for determining whether the Bluetooth packet is valid, a header having a size of 54 bits, and a payload having a size ranging from 0 to 2,745 bits. The access code is used to determine a validity of the Bluetooth packet. The header includes a MAC address and a packet type. The payload includes transmitted data, and a size of the payload varies based on a type of a transmitted packet. The transmitted access point connection information is included in a payload of a packet.

The access point connection information that is transmitted via short-range communication may include any of an SSID (e.g., green1), a MAC address, and a security method (e.g., a WPA2-based method).

Further, the controller 110 may transmit electronic apparatus information that corresponds to the electronic apparatus 100 to the audio device 200 having the changed audio device name via short-range communication. The electronic apparatus information may include, for example, any of an SSID, a MAC address, operation information (e.g., a busy mode or a standby mode), and/or context information.

The controller 210 of the audio device 200 may receive the access point connection information via short-range communication. In operation 408, the controller 210 may store the received access point connection information in the storage 280.

The controller 210 of the audio device 200 may store the received electronic apparatus information that is received via the short-range communication in the storage 280. The controller 210 of the audio device 200 may transmit a reply that corresponds to a completion of the reception of the access point connection information to the electronic apparatus 100.

In operation 409, when the access point connection information is received from the electronic apparatus 100, the controller 210 changes the changed audio device name back to the original audio device name.

The controller 210 changes the changed audio device name (e.g., "[Samsung] Soundbar." in the audio device name information to the original audio device name (e.g., [Samsung] Soundbar). The controller 210 may store the original audio device name together with the audio device name information.

Referring to FIGS. 4 and 5D, the user inputs a password 601a' on the application screen 602 that is displayed on the electronic apparatus 100. When the password 601a is included in the access point connection information that is stored in the audio device 200, the user may not be required to input the password 601a'.

The user performs a fourth touch 504 on an item "Connect 602b" on the application screen 602. The controller 110 may detect the fourth touch 504 by using the touchscreen 190 and the touchscreen controller 195. The controller 110 may calculate a fourth touch position 504a (e.g., X4 and Y4 coordinates) that corresponds to the fourth touch 504 by using an electrical signal that is received from the touchscreen controller 195.

The controller 110 may store fourth touch position information that corresponds to the fourth touch position 504a in the storage 175. The stored fourth touch position information may include any of a touch ID for history management, a touch position, a touch detection time, and/or touch information (e.g., a touch pressure, a touch direction, or a touch duration).

In operation 410, when the password 601a' and the fourth touch 504 are input, the audio device 200 is connected to the access point 50 via Wi-Fi by using the received access point connection information.

The controller 210 of the audio device 200 may be connected to the electronic apparatus 100 and the access point 50 by using different wireless communication methods. For example, the controller 210 of the audio device 200 may connect to the electronic apparatus 100 via Bluetooth. The controller 210 of the audio device 200 may connect to the access point 50 via Wi-Fi. Alternatively, the controller 210 of the audio device 200 may connect to the electronic apparatus 100 and the access point 50 by using the same wireless communication (e.g., Wi-Fi or Bluetooth).

In operation S350 of FIG. 3, a reply that corresponds to the establishment of the connection to the access point 50 is received from the audio device 200.

The controller 210 of the audio device 200 may transmit a reply that corresponds to the connection to the access point 50 to the electronic apparatus 100. The controller 110 of the electronic apparatus 100 may receive the reply that corresponds to the connection to the access point 50 from the audio device 200. The controller 110 may store the received reply that corresponds to the connection to the access point 50 in the storage 175.

Figure 5E:
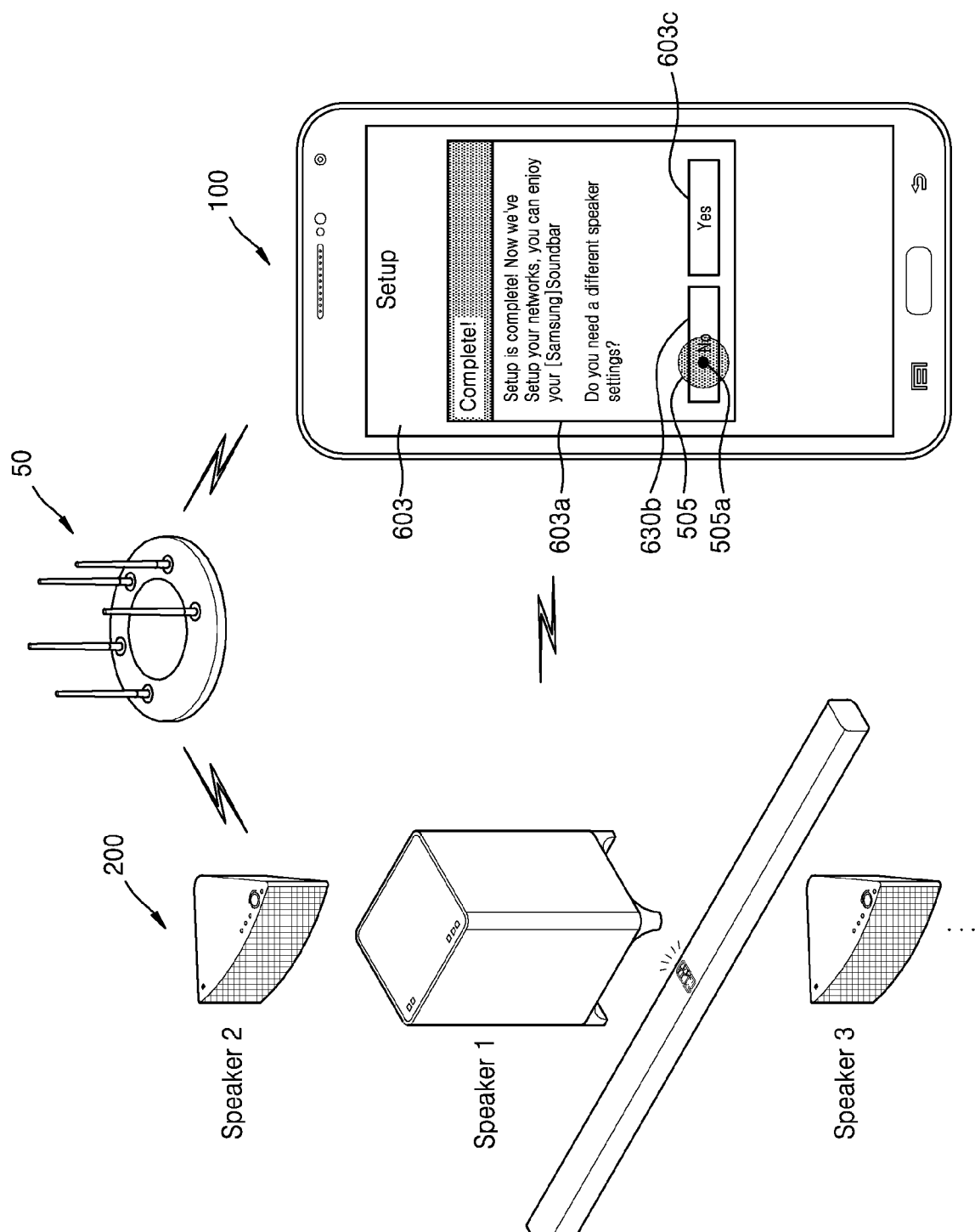

Referring to FIGS. 4 and 5E, in operation 411, when a reply that corresponds to success in establishing the connection to the access point 50 is received from the audio device 200, the controller 110 of the electronic apparatus 100 may display the reply that corresponds to the success in the establishment of the connection to the access point 50 from the audio device 200 on the application screen 603.

The controller 110 may display the reply that corresponds to the success in the establishment of the connection between the audio device 200 and the access point 50 as a popup window 603a on the application screen 603.

The controller 110 may provide a feedback in response to the reply that corresponds to the success in establishing the connection between the audio device 200 and the access point 50 to the user. The feedback provided by the electronic apparatus 100 may be provided as one of a visual feedback, an auditory feedback, and a tactile feedback to the user. The controller 110 may provide to the user, via the electronic apparatus 100, one of the visual feedback, the auditory feedback, and the tactile feedback, or a combination of the visual feedback, the auditory feedback, and the tactile feedback.

The visual feedback may be displayed so that a visual effect (e.g., a separate image or an animation effect, such as fading, applied to the separate image) that corresponds to the reply that corresponds to the connection to the access point 50 is distinguished from another object (e.g., a popup window) displayed on the application screen 603. The auditory feedback may be output via the speaker 163 as a sound that corresponds to the reply that corresponds to the connection to the access point 50. The tactile feedback may be output from the vibration motor 164 in response to the reply that corresponds to the connection to the access point 50.

In an exemplary configuration (not shown) of the electronic apparatus 100, the feedback (e.g., at least one of the visual feedback, the auditory feedback, and the tactile feedback) in response to the reply that corresponds to the success in establishing the connection to the audio device 200 and the access point 50 may be selected and/or changed.

The user may input and/or change a feedback time (e.g., 300 msec or the like) for which the at least one feedback is provided to the user.

Referring to FIG. 5E, the user may select an item No 603b or an item Yes 603c in response to whether another audio device 200 is to be added. When it is determined in operation S360 that another audio device 200 is not to be added, the user performs a fifth touch 505 on the item "No 603b". The controller 110 may detect the fifth touch 505 by using the touchscreen 190 and the touchscreen controller 195. The controller 110 may calculate a fifth touch position 505a (e.g., X5 and Y5 coordinates) that corresponds to the fifth touch 505 by using an electrical signal that is received from the touchscreen controller 195.

The controller 110 may store fifth touch position information that corresponds to the fifth touch position 505a in the storage 175. The stored fifth touch position information may include any of a touch ID for history management, a touch position, a touch detection time, and/or touch information (e.g., a touch pressure, a touch direction, or a touch duration).

In operation S370 of FIG. 3, the connection to the audio device 200 is terminated.

Referring to FIGS. 4 and 5E, in operation 412, the electronic apparatus 100 and the audio device 200 terminate the wireless connection therebetween. When the reply that corresponds to the success in establishing the connection to the audio device 200 and the access point 50 is transmitted from the audio device 200 to the electronic apparatus 100, the controller 210 terminates the wireless connection to the electronic apparatus 100. When the reply that corresponds to the success in establishing the connection to the audio device 200 and the access point 50 is received from the electronic apparatus 100, the controller 110 may terminate the wireless connection to the audio device 200.

Figure 5F:
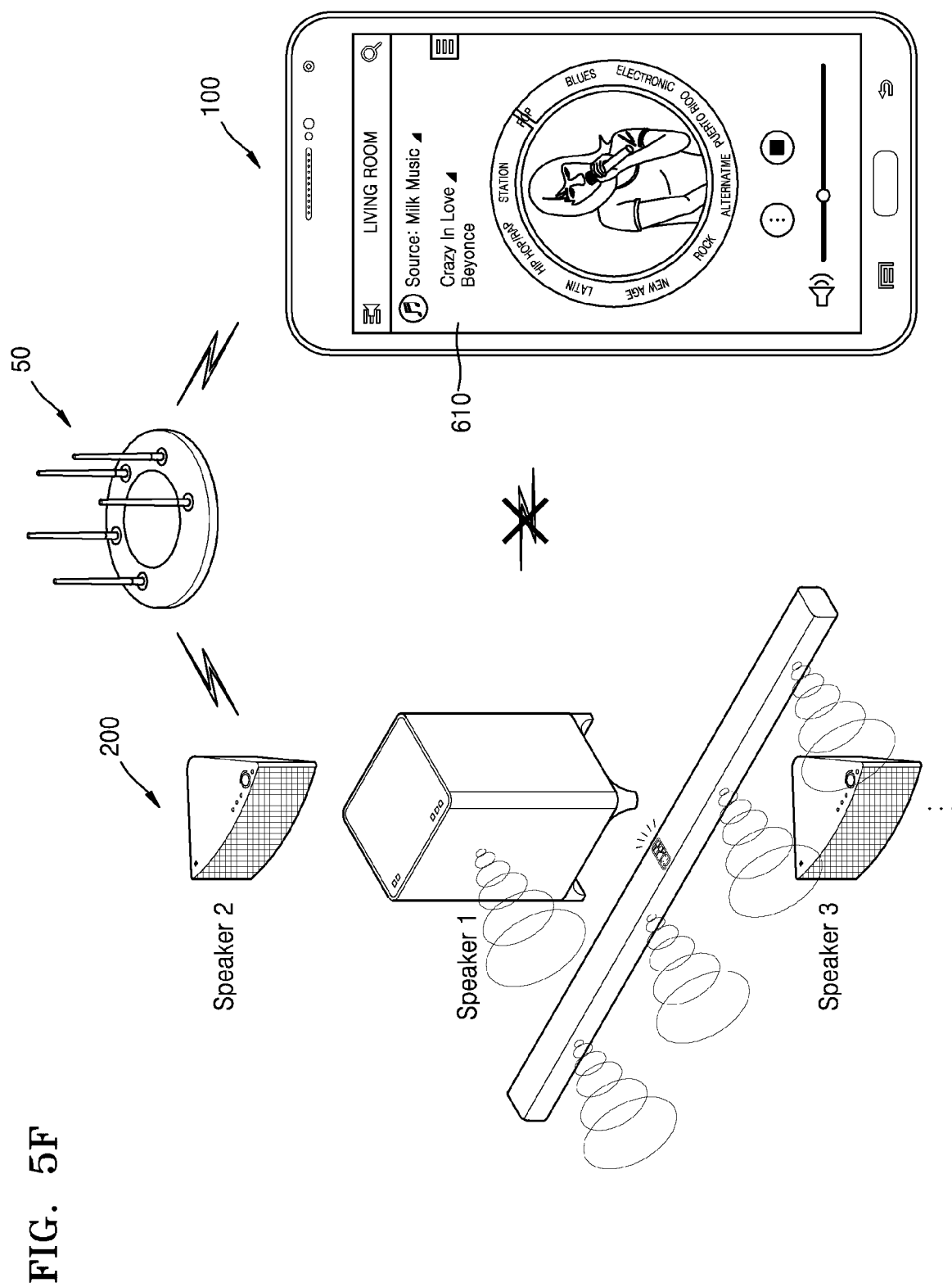

Referring to FIG. 5F, the controller 110 displays a screen 610 of a music application that is executed in response to the fifth touch 505.

The controller 110 may control a song (e.g., a song provided from a content server (not shown)) that has been reproduced in the music application to be output (e.g., to be streamed) via the audio device 200 that is connected to the access point 50.

The controller 110 may control the song that has been reproduced in the music application to be output to the audio device 200 that was connected to the access point 50 most recently. Further, the controller 110 may select the audio device 200 that is to output the song reproduced in the music application (for example, in an audio device list when there are a plurality of the audio devices 200).

The controller 210 of the audio device 200 may output an audio stream received from the speaker 275. The controller 210 may output a received audio (including an audio stream) in consideration of the number of the speakers 275 and the number of additional speakers (not shown). For example, when the number of speakers that corresponds to the received audio (including the audio stream) is equal to the number of speakers of a 5.1-channel system, the controller 210 may output the received audio to the speakers 275 (having, for example, a 5.1-channel system) of the audio device 200. Alternatively, when the number of speakers that corresponds to the received audio (including the audio stream) is equal to the number of speakers of a 5.1-channel system, the controller 210 may add additional speakers (having, for example, a 3-channel system) to the speakers 275 (having, for example, a 2.1-channel system) of the audio device 200 and may output the received audio to the speakers collectively having a 5.1-channel system.

Figure 5G:
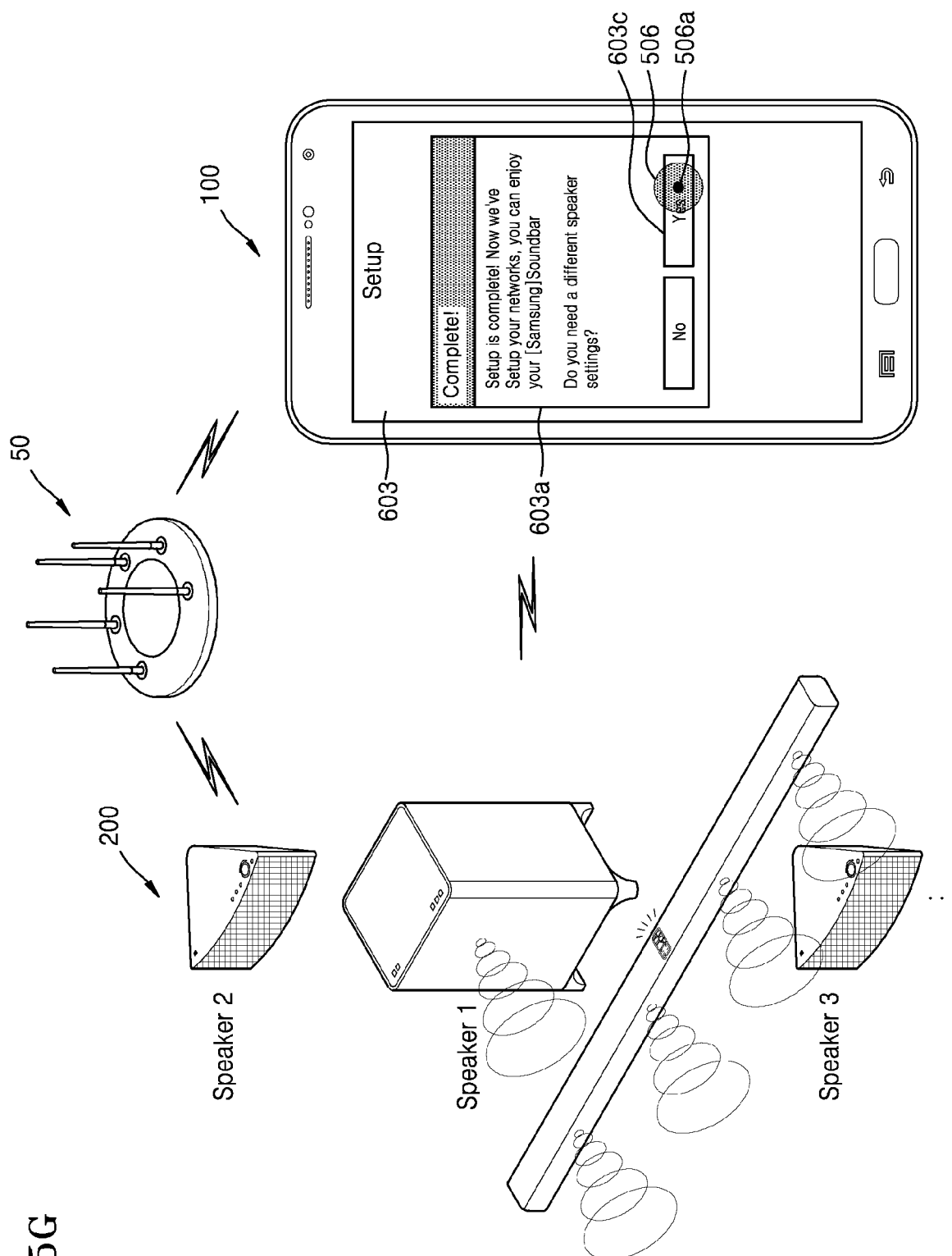

In operation S370 of FIG. 3, and referring also to FIG. 5G, when the connection to the electronic apparatus 100 and the audio device 200 is terminated, the method performed by the electronic apparatus to set the network of the audio device 200 is completed.

When it is determined in operation S360 that another audio device 200 is added, the method proceeds to operation S380 of FIG. 3.

Referring to FIG. 5G, when another audio device 200 is added, the user performs a sixth touch 506 on the item "Yes 603c". The controller 110 may detect the sixth touch 506 by using the touchscreen 190 and the touchscreen controller 195. The controller 110 may calculate a sixth touch position 506a (e.g., X6 and Y6 coordinates) that corresponds to the sixth touch 506 by using an electrical signal that is received from the touchscreen controller 195.

The controller 110 may store sixth touch position information that corresponds to the sixth touch position 506a in the storage 175. The stored sixth touch position information may include any of a touch ID for history management, a touch position, a touch detection time, and/or touch information (e.g., a touch pressure, a touch direction, or a touch duration).

The user makes a $12^{th}$ touch 512 and a $13^{th}$ touch 513 on power buttons of audio devices 202 and 203 that are different from each other. Power is first supplied to the audio devices 202 and 203 in response to the $12^{th}$ touch 512 and the $13^{th}$ touch 513.

The controller 210 of each of the audio devices 202 and 203 to which the power is initially supplied may change an original audio device name. A method for changing the original audio device name of each of the audio devices 202 and 203 is substantially the same as that of the audio device 200 except that the audio devices 202 and 203 are different, and thus a repeated explanation thereof will not be given.

A method for storing a changed audio device name is substantially the same as that of the audio device 200 except that the audio devices 202 and 203 are different, and thus a repeated explanation thereof will not be given.

When the audio devices 202 and 203 are added, the electronic apparatus 100 may not be required to additionally connect to the access point 50. The electronic apparatus 100 may use the access point connection information that has previously been stored in the storage 175.

The electronic apparatus 100 may discover the audio devices 202 and 203 (e.g., the audio devices 202 and 203 each having a changed audio device name) by using activated short-range communication (e.g., Bluetooth). When power is first supplied to the audio devices 202 and 203, the controller 110 may inquire or page the audio devices 202 and 203, each of which has the changed audio device name. A method for connecting the audio devices 202 and 203 and the electronic apparatus 100 via short-range communication is substantially the same as that of connecting the audio device 200 and the electronic apparatus 100 via short-range communication except that the audio devices 202 and 203 are different, and thus a repeated explanation thereof will not be given.

Figure 5H:
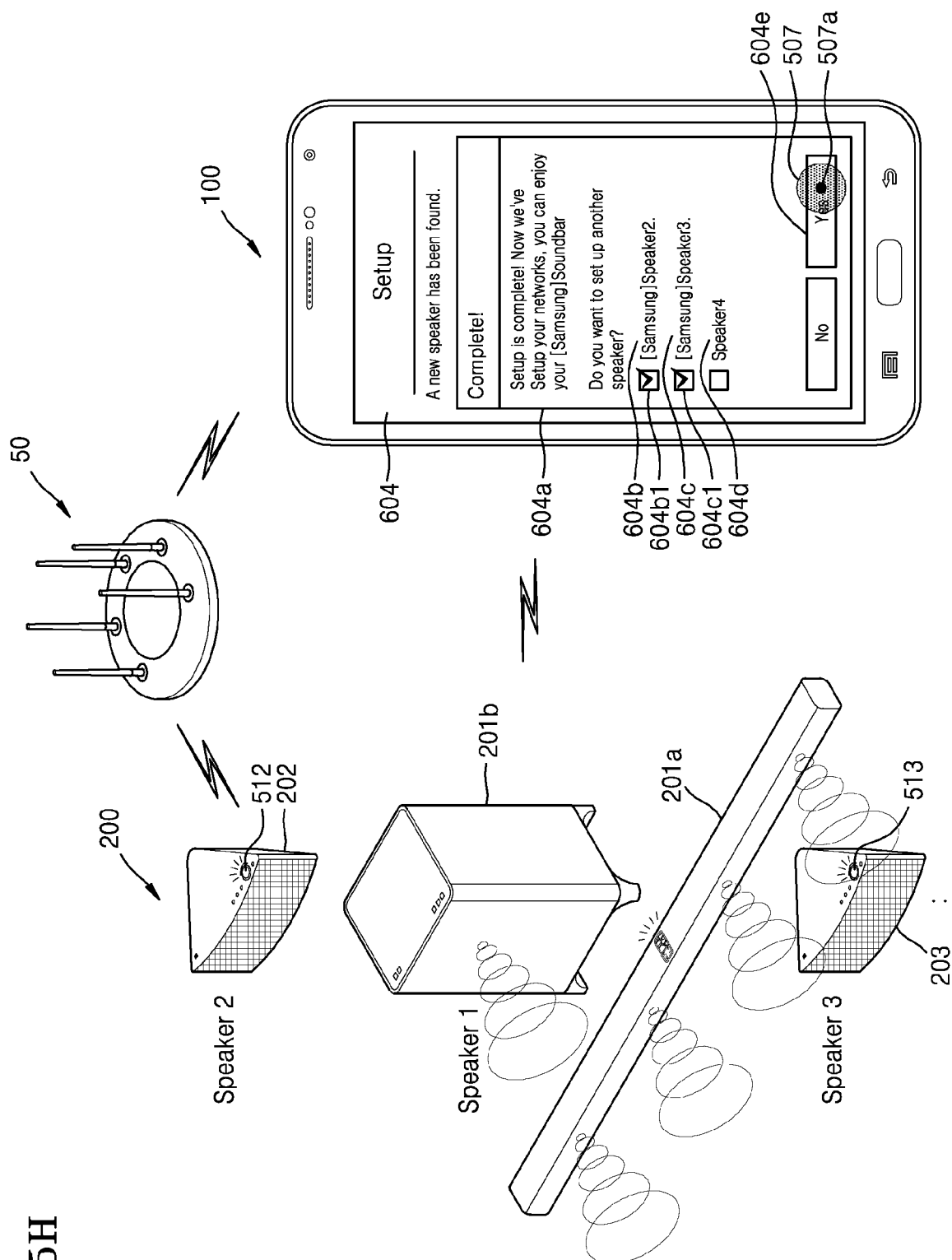

Referring to FIG. 5H, the controller 110 displays an application screen 604 in response to the sixth touch 506. The controller 110 may display the audio devices 202 and 203, each of which has the changed audio device name, on the application screen 604. In addition, the controller 110 may display another audio device 604*d* having an original audio device name on the application screen 604.

A changed audio device name 604*b* (e.g., [Samsung] Speaker2.) that corresponds to the audio device 202 is displayed on the application screen 604. Further, a changed audio device name 604*c* (e.g., [Samsung] Speaker3.) that corresponds to the audio device 203 is displayed on the application screen 604.

The user's selections 604*b*1 and 604*c*1 are input in order to select boxes that respectively correspond to the changed audio device names 604*b* and 604*c* displayed on the application screen 604.

The user makes a seventh touch 507 on an item "Yes 604*e*" on the application screen 604 in order to set a network of each of the audio devices 202 and 203. The controller 110 may detect the seventh touch 507 by using the touchscreen 190 and the touchscreen controller 195. The controller 110 may calculate a seventh touch position 507*a* (e.g., X7 and Y7 coordinates) that corresponds to the seventh touch 507 by using an electrical signal that is received from the touchscreen controller 195.

The controller 110 may store seventh touch position information that corresponds to the seventh touch position 507*a* in the storage 175. The stored seventh touch position information may include any of a touch ID for history management, a touch position, a touch detection time, and/or touch information (e.g., a touch pressure, a touch direction, or a touch duration).

The electronic apparatus 100 may transmit access point connection information to each of the audio devices 202 and 203 via short-range communication in response to the seventh touch 507. A method for transmitting the access point connection information to each of the audio devices 202 and 203 via short-range communication is substantially the same as that of transmitting the access point connection information to the audio device 200 via short-range communication except that the audio devices 202 and 203 are different, and thus a repeated explanation thereof will not be given.

When the audio devices 202 and 203 are added, the user may not be required to additionally input a password. The access point connection information that corresponds to the audio devices 202 and 203 may include a password.

The audio devices 202 and 203 may connect to the access point 50 by using the received access point connection information. A method for connecting the audio devices 202 and 203 and the access point 50 is substantially the same as that of connecting the audio device 200 and the access point 50 except that the audio devices 202 and 203 are different, and thus a repeated explanation thereof will not be given.

When the audio devices 202 and 203 and the access point 50 are connected to each other, each of the audio devices 202 and 203 may transmit a reply that corresponds to the connection to the access point 50 to the electronic apparatus 100. The controller 110 of the electronic apparatus 100 may receive the reply that corresponds to the connection to the access point 50 from each of the audio devices 202 and 203. The controller 110 may store the received reply that corresponds to the connection to the access point 50 in the storage 175.

Figure 5I:
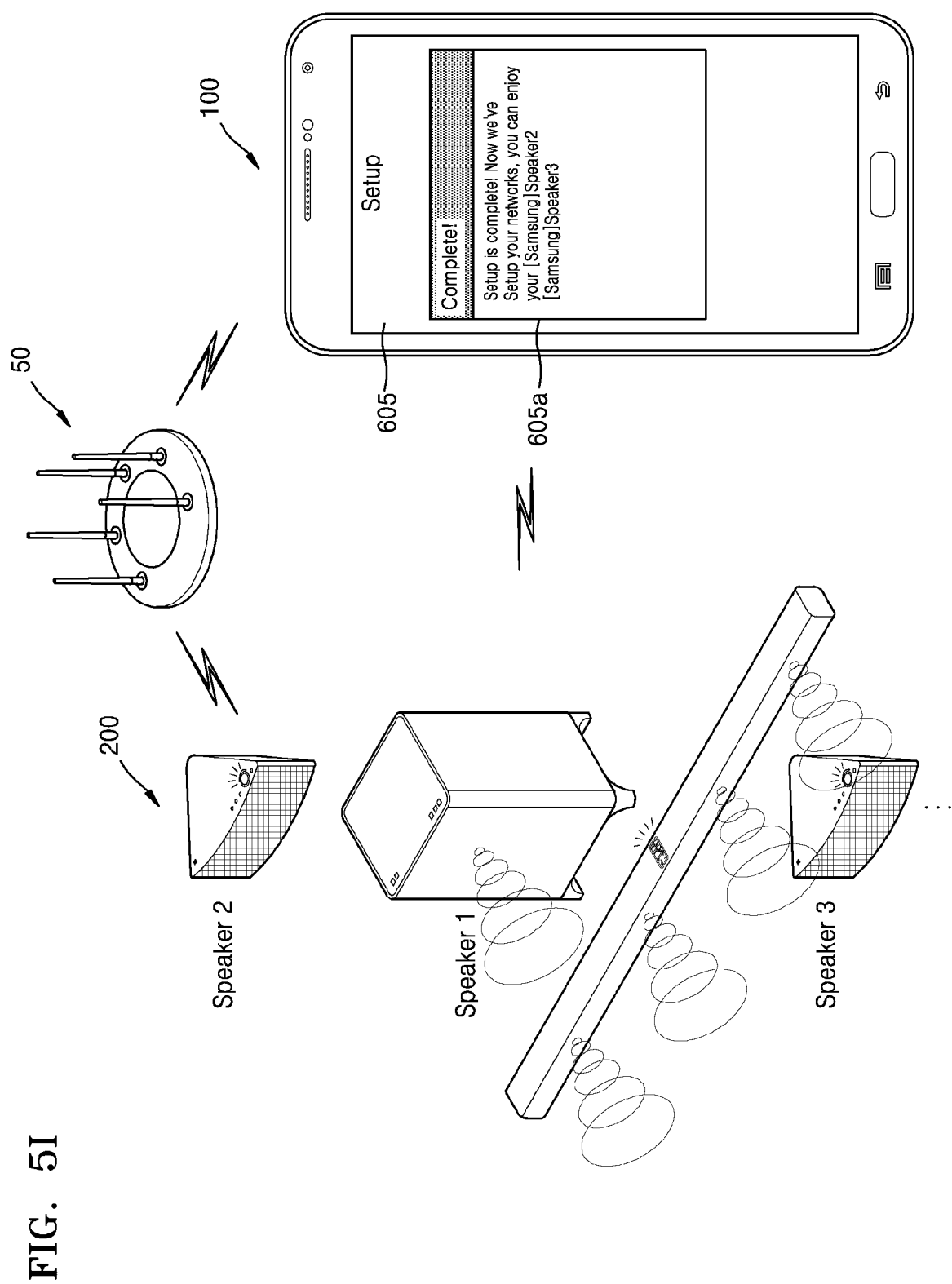

Referring to FIG. 5I, the controller 110 of the electronic apparatus 100 may display a reply that corresponds to the connection to the access point 50 from each of the audio devices 202 and 203 as a popup window 605*a* on an application screen 605.

The controller 110 of the electronic apparatus 100 may provide, to the user, a feedback in response to a reply that corresponds to success in establishing the connection between the audio devices 202 and 203 and the access point 50. The feedback in response to the reply that corresponds to the success in the establishment of the connection between the audio devices 202 and 203 and the access point 50 is substantially the same as the feedback in response to the reply that corresponds to the connection between the audio device 200 and the access point 50 except that the audio devices 202 and 203 are different, and thus a repeated explanation thereof will not be given.

The connection between the electronic apparatus 100 and the audio devices 202 and 203 is terminated.

When the reply that corresponds to the connection to the access point 50 is transmitted from each of the audio devices 202 and 203 to the electronic apparatus 100, each controller 210 terminates the wireless connection to the electronic apparatus 100. When the reply that corresponds to the connection to the access point 50 is received by the electronic apparatus 100, the controller 110 may terminate the wireless connection to the audio devices 202 and 203.

Figure 5J:
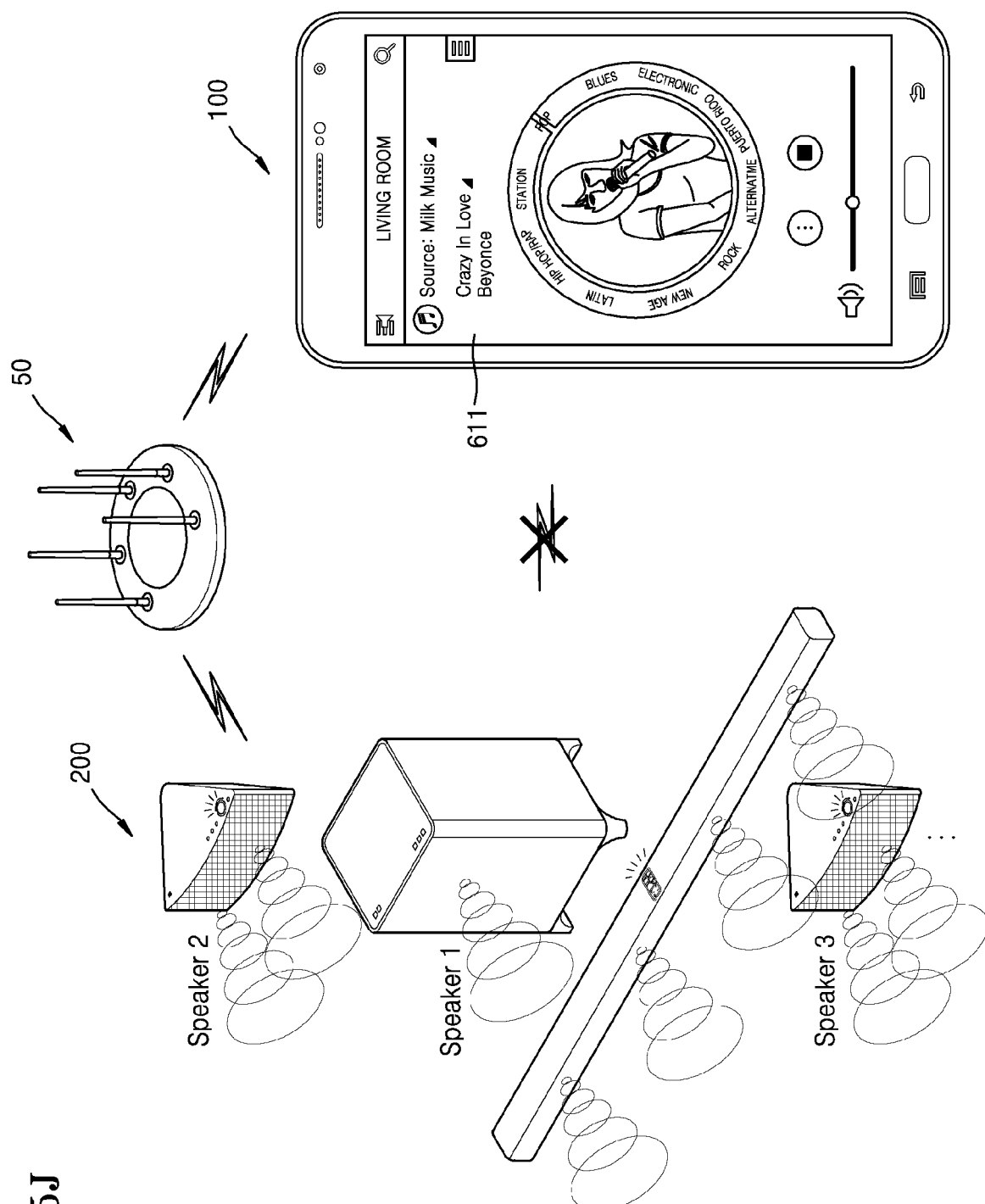

Referring to FIG. 5J, the controller 110 may control a song (e.g., a song provided by a content server (not shown)) which has been reproduced in a music application to be output via the audio devices 200, 202, and 203 that are connected to the access point 50.

When the connection between the electronic apparatus 100 and the audio devices 202 and 203 is terminated, the method for setting the network of each of the audio devices 202 and 203 is completed.

There may be provided an electronic apparatus that is connected to an audio device via first wireless communication and may easily set a network of the audio device by using access point connection information that corresponds to an access point that is connected via second wireless communication and a method performed by the electronic apparatus to set a network of the audio device.

There may be provided an electronic apparatus that may discover and select an audio device having a changed audio device name via first wireless communication and may easily set a network of the audio device having the changed audio device name by using access point connection information that corresponds to an access point that is connected via second wireless communication and a method performed by the electronic apparatus to set a network of the audio device.

There may be provided an electronic apparatus that is connected to an audio device via first wireless communication and may set a network of the audio device by using access point connection information that corresponds to an access point that is connected via second wireless communication and a method performed by the electronic apparatus to set a network of the audio device.

The method according to the exemplary embodiment may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. For example, the computer-readable medium may be stored in a volatile or nonvolatile storage device, such as a read-only memory (ROM), a memory such as a random access memory (RAM), a memory chip, or an integrated circuit, or a storage medium that may be optically or magnetically recorded to and read from by a machine (e.g., a computer) such as a compact disk (CD), a digital versatile disk (DVD), a magnetic disk, or a magnetic tape, regardless of a deletion possibility or a re-recording possibility.

It will be understood by one of ordinary skill in the art that a memory that may be included in a mobile terminal is a storage medium that may be read by a machine for storing programs or a program including instructions according to exemplary embodiments. The program command recorded on the computer-readable medium may be specially designed and constructed for one or more exemplary embodiments or may be known to and usable by one of ordinary skill in a field of computer software.

While the present inventive concept has been particularly shown and described with reference to exemplary embodiments thereof, it will be understood by those of ordinary skill in the art that various changes in form and details may be made therein without departing from the spirit and scope of the present inventive concept as defined by the appended claims. The exemplary embodiments should be considered in descriptive sense only and not for purposes of limitation.

Therefore, the scope of the present inventive concept is defined not by the detailed description but by the appended claims, and all differences within the scope will be construed as being included in the present inventive concept.

What is claimed is:

1. A method for operating an electronic apparatus, the method comprising:
    performing a discovering operation to discover an external electronic device, and establishing a connection with the external electronic device, of which operation is controlled by the electronic apparatus, through a second wireless communication interface of the electronic apparatus in a second wireless communication method,
    in response to receiving information of the external electronic device via the second wireless communication method according to the discovering operation, determining whether the external electronic device discovered through the discovering operation is in a state which requires a connection to an access point via a first wireless communication method,
    in response to the determining that the external electronic device is in the state requiring the connection to the access point through the first wireless communication method, automatically providing, in the electronic apparatus, a user interface for receiving a user input including access point connection information including a password for the access point, for connecting to the access point via the first wireless communication method to enable the external electronic device to perform the connection to the access point via the first wireless communication method,
    in response to receiving the user input including the access point connection information through the user interface, transmitting to the external electronic device, via the second wireless communication method, the access point connection information for enabling the external electronic device to perform the connection to the access point, and
    in response to receiving a reply from the external electronic device, indicating that the connection between the external electronic device and the access point has been established by using the access point connection information, terminating the connection with the external electronic device through the second wireless communication interface.

2. The method of claim 1, wherein the information of the external electronic device is received while the discovering operation is performed.

3. The method of claim 1, wherein the information of the external electronic device received through the discovering operation is identification information of the external electronic device for the second wireless communication method.

4. The method of claim 2, wherein the performing the discovering operation further comprises providing an image representing the external electronic device when the external electronic device is discovered in the discovering operation.

5. The method of claim 1, wherein the performing the discovering operation further comprises discovering a plurality of different external devices,
    the determining further comprises determining that the plurality of different external devices are in the state requiring a connection to the access point via the first wireless communication method,
    the providing the user interface further comprises providing the user interface comprising a plurality of selectable items, each respective selectable item corresponding to one of the plurality of different external devices, and
    the external electronic device is included in the plurality of different external devices.

6. The method of claim 1, wherein the performing the discovering operation further comprises receiving identification information of the external electronic device in the second wireless communication method during the discovering operation, and
    wherein the identification information of the external electronic device represents that the external electronic device requires the access point connection information for communication in the first wireless communication method.

7. A non-transitory computer readable medium storing a program which, when executed by a computer, causes the computer to execute a method for operating an electronic apparatus, the method including:
    performing a discovering operation to discover an external electronic device, and establishing a connection with the external electronic device, of which operation is controlled by the electronic apparatus, through a second wireless communication interface of the electronic apparatus in a second wireless communication method,
    in response to receiving information of the external electronic device via the second wireless communication method according to the discovering operation, determining whether the external electronic device discovered through the discovering operation is in a state which requires a connection to an access point via a first wireless communication method,
    in response to the determining that the external electronic device is in the state requiring the connection to the access point through the first wireless communication method, providing, in the electronic apparatus, a user interface for receiving a user input including access point connection information including a password for the access point, for connecting to the access point via the first wireless communication method to enable the external electronic device to perform the connection to the access point via the first wireless communication method,
    in response to receiving the user input including the access point connection information through the user interface, transmitting to the external electronic device, via the second wireless communication method, the access point connection information for enabling the external electronic device to perform the connection to the access point, and in response to receiving a reply from the external electronic device, indicating that the connection between the external electronic device and the access point has been established by using the access point connection information, terminating the connection with the external electronic device through the second wireless communication interface.

8. The non-transitory computer readable medium of claim 7, wherein the information of the external electronic device is received while the discovering operation is performed.

9. The non-transitory computer readable medium of claim 7, wherein the information of the external electronic device received through the discovering operation is identification information of the external electronic device for the second wireless communication method.

10. The non-transitory computer readable medium of claim 8, wherein the performing the discovering operation further includes providing an image representing the external electronic device when the external electronic device is discovered while performing the discovering operation.

11. The non-transitory computer readable medium of claim 7, wherein the performing the discovering operation further includes discovering a plurality of different external devices, the determining further includes determine that the plurality of different external devices are in the state requiring a connection to the access point via the first wireless communication method, the providing the user interface further includes providing the user interface comprising a plurality of selectable items, each respective selectable item corresponding to one of the plurality of different external devices, and the external electronic device is included in the plurality of different external devices.

12. An electronic apparatus comprising:

a first wireless communication interface configured to wirelessly communicate via a first wireless communication method;

a second wireless communication interface configured to wirelessly communicate via a second wireless communication method; and a controller configured to:

perform a discovering operation to discover an external electronic device, and establish a connection with the external electronic device, of which operation is controlled by the electronic apparatus, through the second wireless communication interface using the second wireless communication method, in response to receiving information of the external electronic device via the second wireless communication method according to the discovering operation, determine whether the external electronic device discovered through the discovering operation is in a state which requires a connection to an access point via the first wireless communication method, in response to the determining that the external electronic device is in the state requiring the connection to the access point through the first wireless communication method, provide a user interface for receiving a user input including access point connection information including a password for the access point, for connecting to the access point via the first wireless communication method to enable the external electronic device to perform the connection to the access point via the first wireless communication method, in response to receiving the user input including the access point connection information through the user interface, transmit to the external electronic device, via the second wireless communication method, the access point connection information for enabling the external electronic device to perform the connection to the access point, and in response to receiving a reply from the external electronic device, indicating that the connection between the external electronic device and the access point has been established by using the access point connection information, terminate the connection with the external electronic device through the second wireless communication interface.

13. The electronic apparatus of claim 12, wherein the controller is further configured to receive the information of the external electronic device while performing the discovering operation.

14. The electronic apparatus of claim 12, wherein the information of the external electronic device received through the discovering operation is identification information of the external electronic device for the second wireless communication method.

15. The electronic apparatus of claim 13, wherein the controller is further configured to, when the external electronic device is discovered while performing the discovering operation, provide an image representing the external electronic device.

16. The electronic apparatus of claim 12, wherein the external electronic device is one of a plurality of different external devices, and the controller is further configured to:

determine that the plurality of different external devices are in the state requiring a connection to the access point via the first wireless communication method, and provide the user interface comprising a plurality of selectable items, each respective selectable item corresponding to one of the plurality of different external devices.

* * * * *